(12) United States Patent
Aikyo

(10) Patent No.: US 12,128,978 B2
(45) Date of Patent: Oct. 29, 2024

(54) SADDLED VEHICLE, VEHICLE, AND OCCUPANT-PROTECTING EQUIPMENT

(71) Applicant: HONDA MOTOR CO., LTD., Tokyo (JP)

(72) Inventor: Yutaka Aikyo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/573,136

(22) PCT Filed: Jul. 27, 2021

(86) PCT No.: PCT/JP2021/027785
§ 371 (c)(1),
(2) Date: Dec. 21, 2023

(87) PCT Pub. No.: WO2023/007591
PCT Pub. Date: Feb. 2, 2023

(65) Prior Publication Data
US 2024/0286695 A1 Aug. 29, 2024

(51) Int. Cl.
*B62J 27/20* (2020.01)
*A41D 13/018* (2006.01)
*A41D 13/05* (2006.01)

(52) U.S. Cl.
CPC ............ *B62J 27/20* (2020.02); *A41D 13/018* (2013.01); *A41D 13/0525* (2013.01)

(58) Field of Classification Search
CPC .... B62J 27/20; A41D 13/018; A41D 13/0525; B60R 2021/0088; B60R 21/231
See application file for complete search history.

(56) References Cited

U.S. PATENT DOCUMENTS

| | | | |
|---|---|---|---|
| 5,938,231 A | 8/1999 | Yamazaki | |
| 2003/0214121 A1* | 11/2003 | Miyata | B60R 21/231 280/730.1 |
| 2005/0029782 A1* | 2/2005 | Miyata | B62J 27/20 280/732 |

(Continued)

FOREIGN PATENT DOCUMENTS

| | | |
|---|---|---|
| GB | 1462125 | 1/1977 |
| JP | H10-006901 A | 1/1998 |
| JP | 2003-312569 A | 11/2003 |

(Continued)

OTHER PUBLICATIONS

EPO translation of WO 2018206182-A1; Publication date Nov. 15, 2018 (Year: 2018).*

(Continued)

*Primary Examiner* — Jason D Shanske
*Assistant Examiner* — Scott Lawrence Strickler
(74) *Attorney, Agent, or Firm* — Rankin, Hill & Clark LLP

(57) ABSTRACT

A saddled vehicle includes a seat for an occupant and an airbag provided in front of the seat; and the airbag includes an upwardly deploying portion that is deployed upward when deployed, a first deploying portion that extends rearward and outward with respect to the upwardly deploying portion, from an upper part of the upwardly deploying portion when deployed, and a downwardly deploying portion that bends and extends downward from the first deploying portion when deployed.

11 Claims, 15 Drawing Sheets

(56) References Cited

U.S. PATENT DOCUMENTS

2006/0175811 A1      8/2006   Goto

FOREIGN PATENT DOCUMENTS

| | | |
|---|---|---|
| JP | 2006218970 A | 8/2006 |
| JP | 2008-121159 A | 5/2008 |
| JP | 2011-184015 A | 9/2011 |
| WO | WO-2018206182 A1 * 11/2018 | ................ B62J 1/12 |

OTHER PUBLICATIONS

International Search Report and Written Opinion Corresponding to International Application No. PCT/JP2021/027785, dated Oct. 12, 2021, 5 pages.

International Preliminary Report on Patentability, International Application No. PCT/JP2021/027785, Date of mailing: Feb. 8, 2024, 5 pages.

* cited by examiner

SADDLED VEHICLE, VEHICLE, AND OCCUPANT-PROTECTING EQUIPMENT

TECHNICAL FIELD

The present invention relates to a saddled vehicle, a vehicle, and occupant-protecting equipment.

BACKGROUND ART

Conventionally, a saddled vehicle has been known that includes an airbag in front of a seat for an occupant in which the airbag includes a portion that is deployed upward in front of the occupant and portions that extend toward the rear side of the occupant through the lateral sides of the occupant (for example, see Patent Literature 1). In Patent Literature 1, surrounding the occupant from the front side and both the left and right sides with the airbag causes the airbag to be in close contact with the occupant to effectively protect the occupant.

CITATION LIST

Patent Literature

[Patent Literature 1]
Japanese Patent Laid-Open No. 10-6901

SUMMARY OF INVENTION

Technical Problem

However, the conventional airbag described above has a large portion extending toward the rear side of the occupant, resulting in a large volume of the airbag and increase in the amount of gas required to deploy the airbag. Therefore, it is desirable to make the airbag compact and to properly bring the airbag into close contact with the occupant.

The present invention has been made in view of the above-mentioned circumstances, and it is an object of the present invention to make an airbag compact in a saddled vehicle, a vehicle, and occupant-protecting equipment, and to properly bring the airbag into close contact with an occupant.

Solution to Problem

A saddled vehicle includes: a seat for an occupant; and an airbag provided in front of the seat or in a front part of the seat, in which the airbag includes an upwardly deploying portion that is deployed upward when deployed, a first deploying portion that extends laterally outward, rearward, or rearward and outward with respect to the upwardly deploying portion, from an upper part of the upwardly deploying portion when deployed, and a downwardly deploying portion that bends and extends downward from the first deploying portion when deployed.

A vehicle includes an airbag provided in front of a riding position for an occupant, in which the vehicle is a stand-up vehicle on which an occupant stands at the riding position, and the airbag includes an upwardly deploying portion that is deployed upward when deployed, a first deploying portion that extends laterally outward, rearward, or rearward and outward with respect to the upwardly deploying portion, from an upper part of the upwardly deploying portion when deployed, and a downwardly deploying portion that bends and extends downward from the first deploying portion when deployed.

Occupant-protecting equipment includes: occupant equipment worn by an occupant riding on a vehicle; and an airbag, in which the airbag is supported by the occupant equipment and is located on a front surface side of a torso of the occupant, and the airbag includes an upwardly deploying portion that is deployed upward when deployed, a first deploying portion that extends laterally outward, rearward, or rearward and outward with respect to the upwardly deploying portion, from an upper part of the upwardly deploying portion when deployed, and a downwardly deploying portion that bends and extends downward from the first deploying portion when deployed.

Advantageous Effects of Invention

The airbag is allowed to be compact and allowed to be properly in close contact with the occupant.

DESCRIPTION OF EMBODIMENTS

Figure 1:
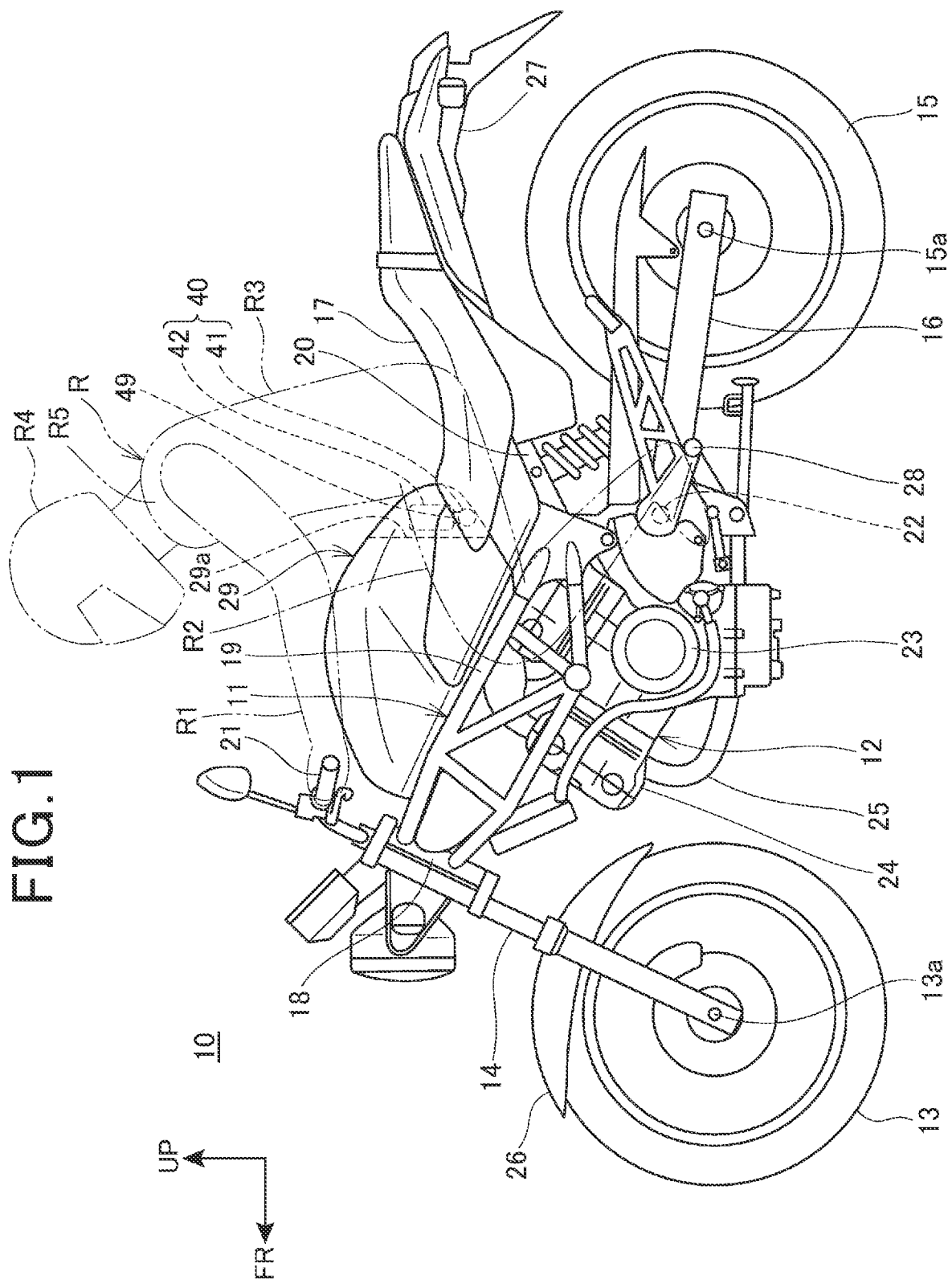
FIG. 1 is a side view of a saddled vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddled vehicle 10 according to an embodiment of the present invention.

The saddled vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for an occupant.

The saddled vehicle 10 is a vehicle on which the occupant sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the occupant grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddled vehicle 10 further includes a front fender 26 that covers the front wheel 13 from above, a rear fender 27 that covers the rear wheel 15 from above, footrests 28 on which the occupant places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The fuel tank 29 is disposed in front of the seat 17 and behind the head pipe 18.

The occupant R sitting on the seat 17 extends both arms R1 forward to grasp the handle 21, puts both feet on the footrests 28, and sandwiches the vehicle body such as the fuel tank 29 and the vehicle body frame 11 between the legs R2 to hold the vehicle body.

The saddled vehicle 10 includes an airbag device 40 that protects the occupant R.

The airbag device 40 is disposed in front of the seat 17, and is provided so as to positionally coincide with the rear end portion of the fuel tank 29 in the vehicle width direction in a vehicle side view.

The airbag device 40 is disposed in an airbag storage portion 29a provided at the rear end portion of the fuel tank 29. The airbag storage portion 29a is, for example, a recessed portion formed in such a way that the rear end portion of the fuel tank 29 is recessed, and the airbag device 40 is disposed within this recessed portion.

The airbag device 40 includes an inflator 41 and an airbag 42 that is inflated by gas released by the inflator 41. The airbag 42 is stored in the airbag storage portion 29a in a folded state. The airbag 42 is disposed in front of the seating position of the occupant R on the seat 17, and is located in front of the occupant. Furthermore, the airbag 42 is disposed at the center in the vehicle width direction, similarly to the front wheels 13 and the seat 17.

The saddled vehicle 10 includes an acceleration sensor (not shown) that detects an impact acting on the saddled vehicle 10. This acceleration sensor is electrically connected to a control unit (not shown) of the saddled vehicle 10, and the control unit is electrically connected to the inflator 41. The control unit determines whether the airbag device 40 to be operated or not based on the detected acceleration. When operating the airbag device 40, the control unit operates the inflator 41 to release gas into the airbag 42. The airbag 42 is inflated and deployed by gas pressure.

The airbag 42 is covered by a cover (not shown) that covers the airbag storage portion 29a from above. When inflated, the airbag 42 pushes away the cover to be deployed.

Figure 2:
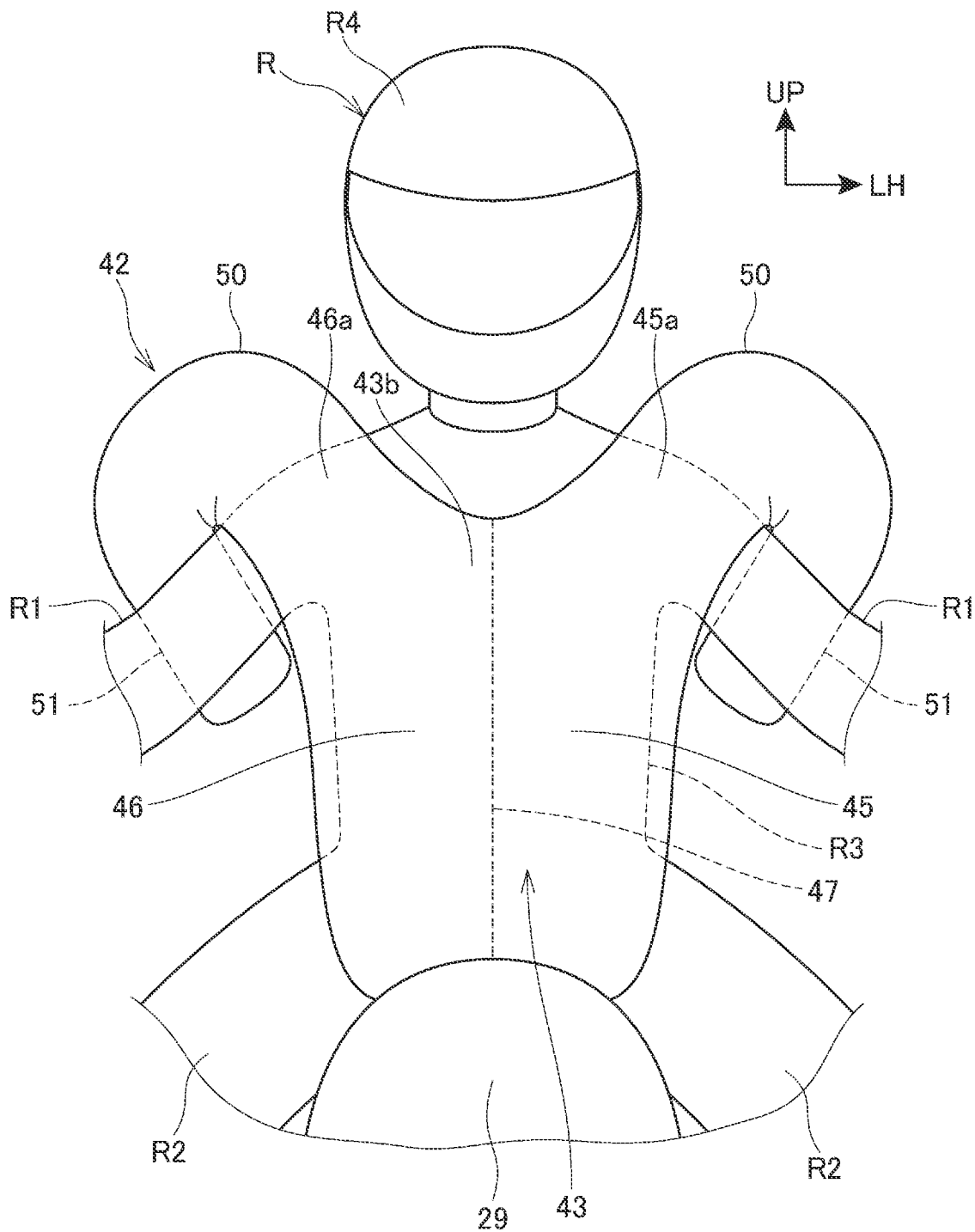
FIG. 2 is a front view of a state, seen from a front side, in which an airbag is deployed to protect an occupant.
Figure 3:
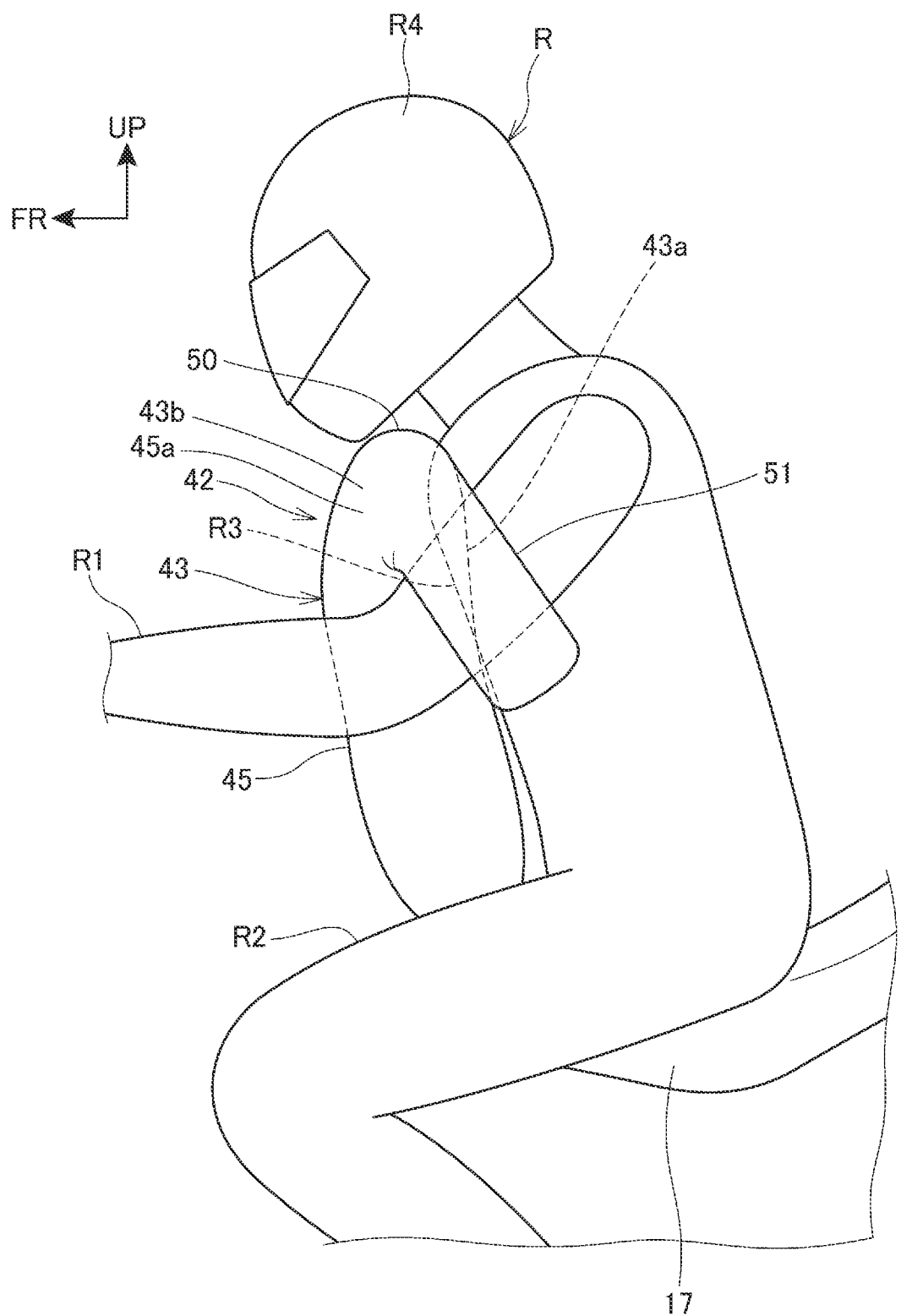
FIG. 3 is a left side view showing a state in which the airbag is deployed to protect the occupant.
Figure 4:
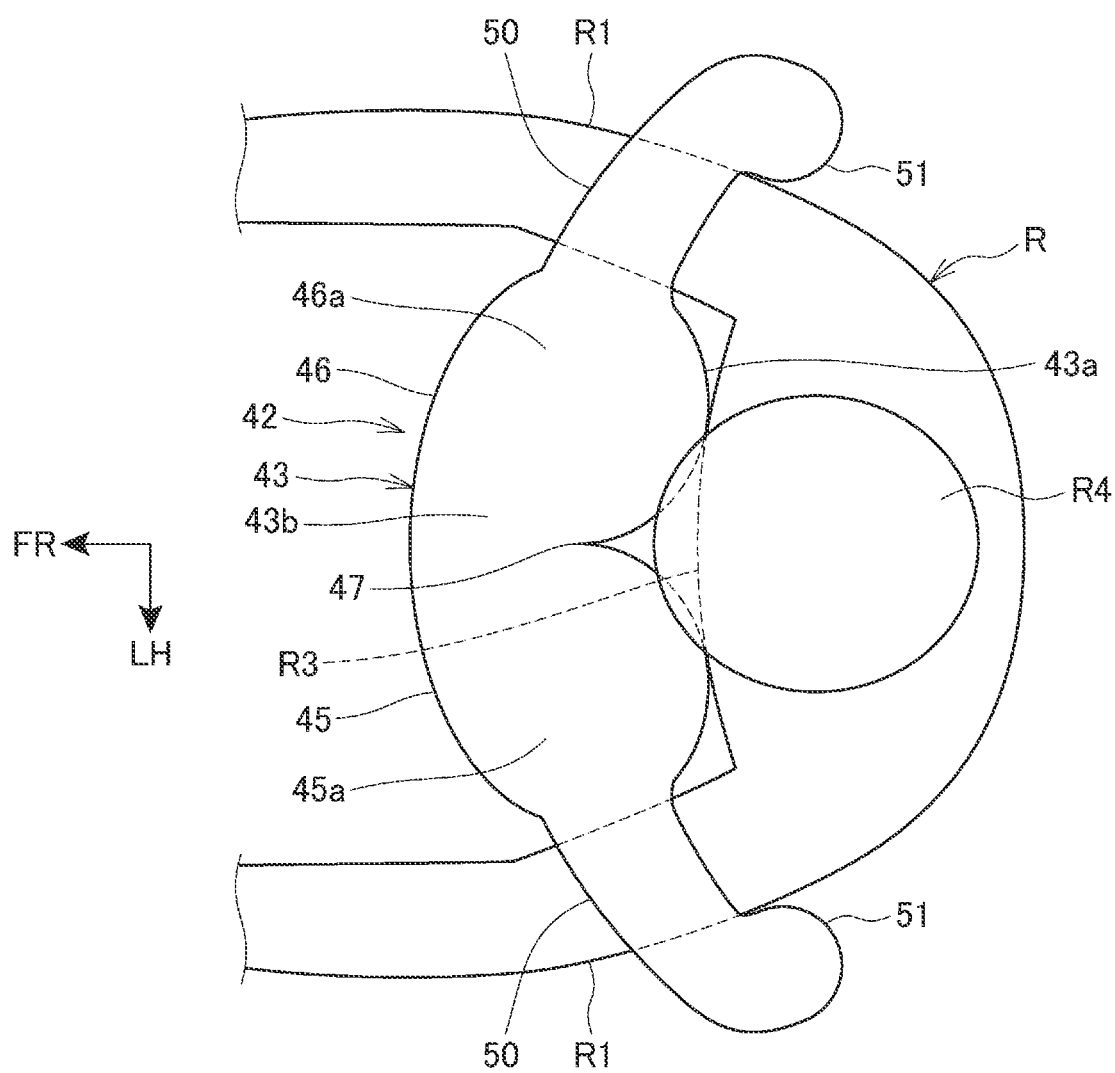
FIG. 4 is a plan view of the state, seen from an upper side, in which the airbag is deployed to protect the occupant.
Figure 5:
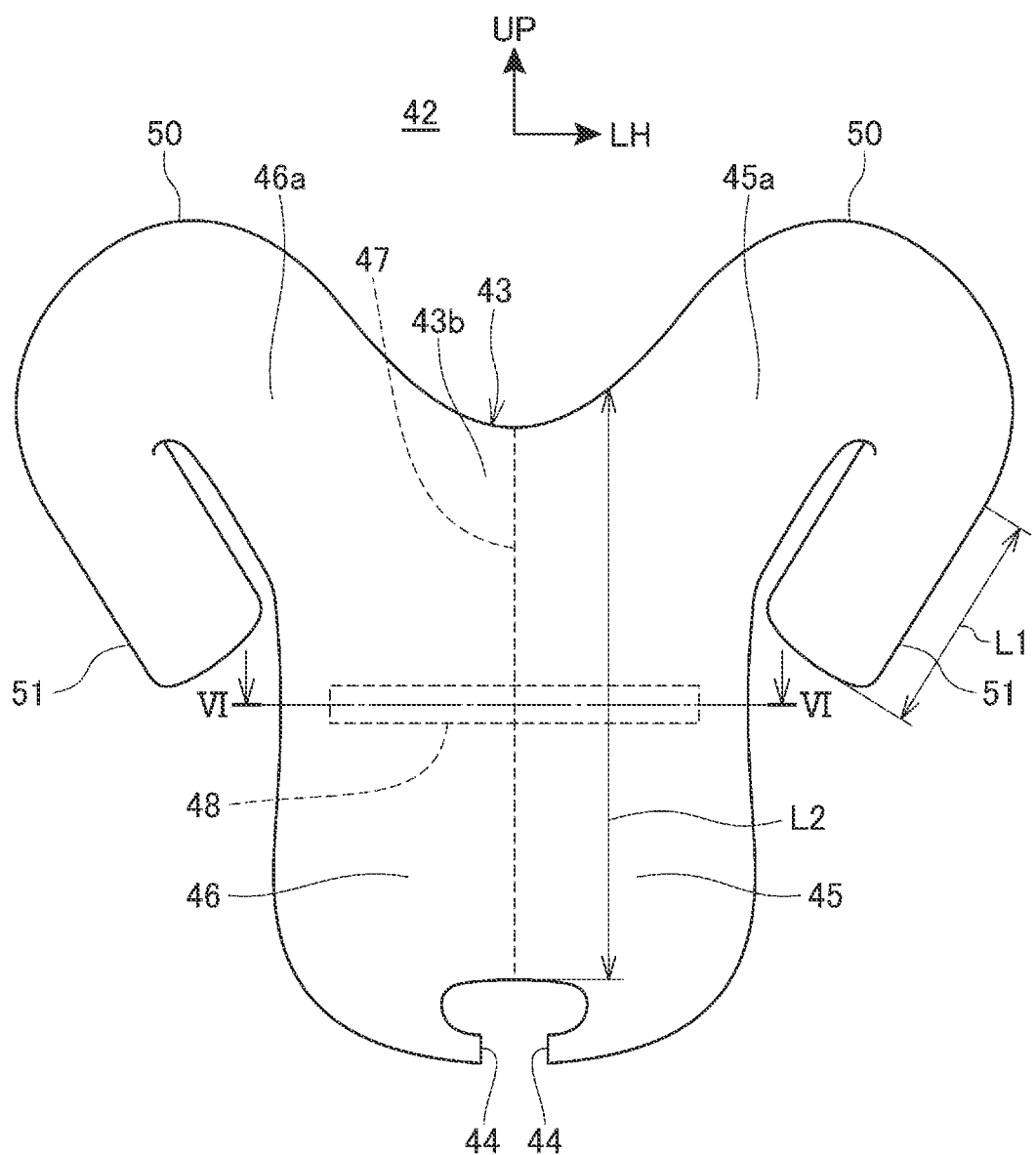
FIG. 5 is a front view of a deployed airbag as seen from the front side.

FIG. 2 is a front view of a state, seen from the front side, in which the airbag 42 is deployed to protect an occupant R. FIG. 3 is a left side view showing the state in which the airbag 42 is deployed to protect the occupant R. FIG. 4 is a plan view of the state, seen from the upper side, in which the airbag 42 is deployed to protect the occupant R. FIG. 5 is a front view of the deployed airbag 42 as seen from the front side.

The airbag 42 includes an upwardly deploying portion 43 that is deployed upward from the airbag storage portion 29a (FIG. 1), a pair of left and right first deploying portions 50 that branches from the upper part of the upwardly deploying portion 43 and extends rearward and outward; a pair of left and right downwardly deploying portions 51 that respectively bend and extend downward from each first deploying portion 50.

Furthermore, the airbag 42 includes inflator connecting portions 44 (FIG. 5) connected to the inflator 41 at the lower end portion of the upwardly deploying portion 43.

Figure 6:
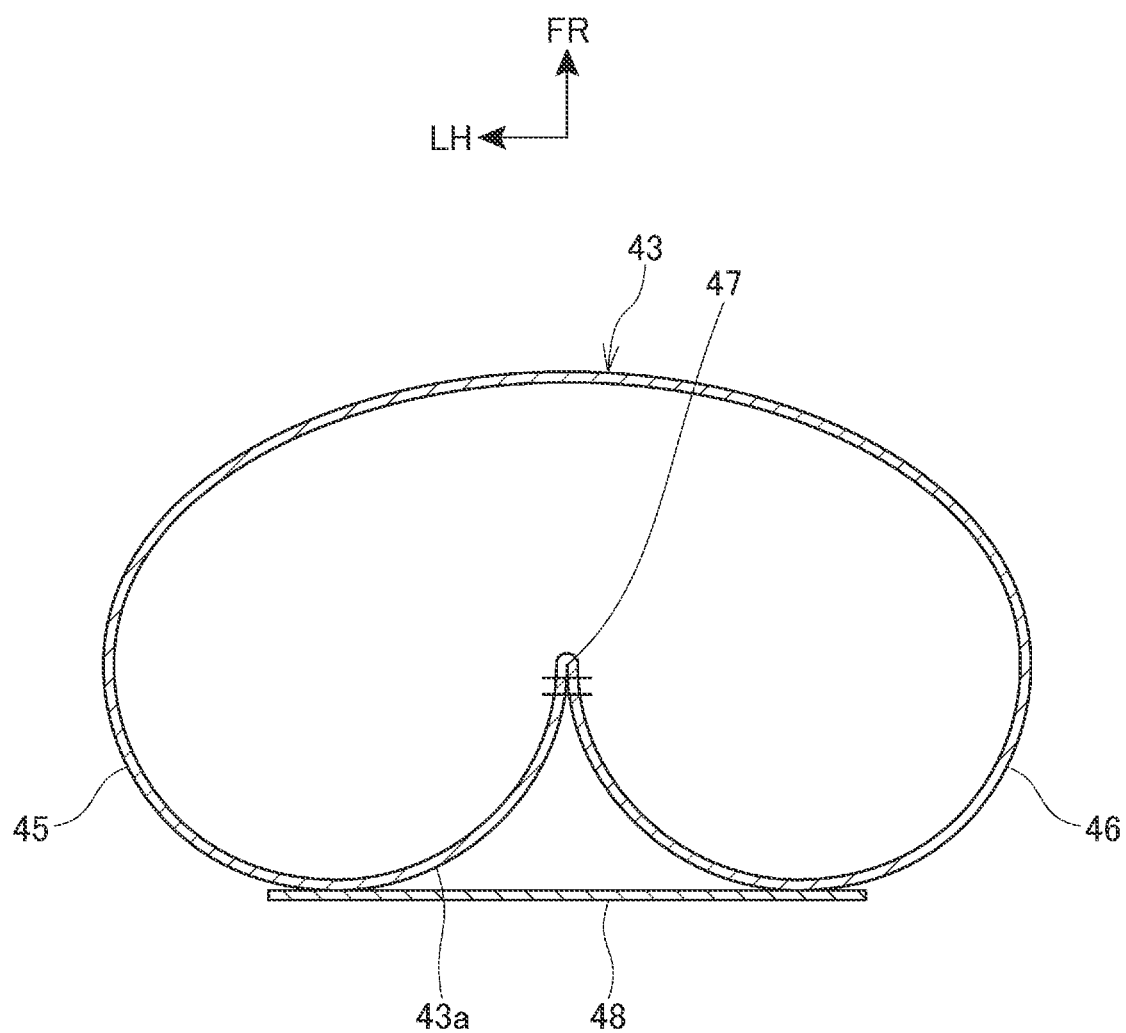
FIG. 6 is a cross-sectional view taken along a VI-VI in FIG. 5.

FIG. 6 is a cross-sectional view taken along a VI-VI in FIG. 5.

With reference to FIGS. 2 to 6, the upwardly deploying portion 43 is disposed at the center in the vehicle width direction and covers the torso R3 of the occupant R from the front side.

The upwardly deploying portion 43 integrally includes a one-side upwardly deploying portion 45 that extends upward from the airbag storage portion 29a (FIG. 1) on one side in the left-right direction relative to the center in the vehicle width direction, and the other-side upwardly deploying portion 46 that extends upward from the airbag storage portion 29a on the other side in the left-right direction relative to the center in the vehicle width direction.

The one-side upwardly deploying portion 45 and the other-side upwardly deploying portion 46 are connected in the vehicle width direction (left-right direction) and extend upward, substantially parallel to each other and substantially vertically.

The upwardly deploying portion 43 extends upward to a position in the upper part of the torso R3 and below the head R4 of the occupant R.

The upwardly deploying portion 43 includes a partition portion 47, on the rear surface 43a of the upwardly deploying portion 43, that partitions the space inside the upwardly deploying portion 43 into left and right, that is, into the one-side upwardly deploying portion 45 and the other-side upwardly deploying portion 46.

The partition portion 47 is a wall portion formed by sewing to couple the center portions in the vehicle width direction in the rear surface 43a so as to protrude forward. The partition portion 47 protrudes into the upwardly deploying portion 43. The partition portion 47 extends in the deploying direction of the upwardly deploying portion 43, that is, in the up-down direction at the central position of the upwardly deploying portion 43 in the vehicle width direction.

The partition portion 47 is provided only in the rear part of the upwardly deploying portion 43, and the one-side upwardly deploying portion 45 and the other-side upwardly deploying portion 46 communicate with each other in the front part of the upwardly deploying portion 43.

The rear surface 43a of the upwardly deploying portion 43 has a connecting member 48 attached thereto that connects the rear surface of the one-side upwardly deploying portion 45 and the rear surface of the other-side upwardly deploying portion 46 in the vehicle width direction.

The connecting member 48 is a belt-shaped string extending in the vehicle width direction. The connecting member 48 extends substantially horizontally in the vehicle width direction with the upwardly deploying portion 43 deployed.

The connecting member 48 is provided in the middle part in the up-down direction of the upwardly deploying portion 43.

In the deployed state, the upwardly deploying portion 43 bends in a V-shape from the partition portion 47, in a top view as shown in FIG. 6. As shown in FIG. 5, the upwardly deploying portion 43 bends, in a V-shape that opens rearward, at the partition portion 47 that is a bending line in a front view. Thereby, in the deployed state, the shape of the rear surface 43a of the upwardly deploying portion 43 is a V-shape along the front surface of the torso R3. This allows the upwardly deploying portion 43 to be properly in close contact with the torso R3.

The connecting member 48 restricts the degree of bending of the upwardly deploying portion 43 in the deployed state, and makes the upwardly deploying portion 43 into a proper V-shape. This allows the upwardly deploying portion 43 to be properly in close contact with the torso R3.

The inflator connecting portions 44 (FIG. 5) are provided in the lower part of the upwardly deploying portion 43, at the lower end portion of the one-side upwardly deploying portion 45 and at the lower end portion of the other-side upwardly deploying portion 46, respectively.

The inflator connecting portions 44 are inlets of gas that deploy the airbag 42, and the gas released by the inflator 41 flows from the inflator connecting portions 44 into the upwardly deploying portion 43. The gas flows upward in the upwardly deploying portion 43 and flows from the upper end portion 43b of the upwardly deploying portion 43 to the first deploying portions 50.

Note that the inflator connecting portions 44 are respectively provided at the one-side upwardly deploying portion 45 and at the other-side upwardly deploying portion 46, but just one inflator connecting portion 44 that is provided in at least one position is needed. Furthermore, although the inflator connecting portion 44 is provided at the lower end portion of the upwardly deploying portion 43, the position is not limited to this, and the inflator connecting portion 44 may be provided at a position below the middle part in the up-down direction of the upwardly deploying portion 43.

The first deploying portions 50 are provided in a pair of left and right at the upper end portion 43b of the upwardly deploying portion 43. Each first deploying portion 50 extends diagonally rearward on the outer side in the vehicle width direction, from the upper end portion 43b of the upwardly deploying portion 43. Furthermore, the first deploying portion 50 inclines to be progressively located upward as the first deploying portion 50 extends rearward.

Specifically, one (left side) first deploying portion 50 extends diagonally rearward on the outer side in the vehicle width direction, from the upper end portion 45a of the one-side upwardly deploying portion 45.

The other (right side) first deploying portion 50 extends diagonally rearward on the outer side in the vehicle width direction, from the upper end portion 46a of the other-side upwardly deploying portion 46.

The first deploying portion 50 has a rod shape that is thinner than the upwardly deploying portion 43. The proximal end portion of the first deploying portion 50 communicates with the inside of the upwardly deploying portion 43.

Each first deploying portion 50 extends diagonally rearward on the outer side in the vehicle width direction, from the upper end portion 43b of the upwardly deploying portion 43 located in front of the upper part of the torso R3, and extends behind the arm R1 through above the arm R1 of the occupant R.

Specifically, the first deploying portion 50 extends diagonally rearward on the outer side in the vehicle width direction through above the upper arm of the arm R1 of the occupant R sitting on the seat 17 and grasping the handle 21. In other words, the first deploying portion 50 covers the upper arm of the arm R1 from above.

Each downwardly deploying portion 51 bends and extends downward from the rear end portion of the first deploying portion 50. The downwardly deploying portion 51 has a rod shape that continuously extends from the first deploying portion 50 and is thinner than the upwardly deploying portion 43. The downwardly deploying portion 51 is located on the outer side in the vehicle width direction relative to the upwardly deploying portion 43. The downwardly deploying portion 51 extends downward through behind the arm R1, and covers the arm R1 from the rear.

In a front view, the downwardly deploying portion 51 inclines to be progressively located inward in the vehicle width direction as the downwardly deploying portion 51 extends downward.

As shown in FIG. 2, each downwardly deploying portion 51 extends below the arm R1 in a portion where the downwardly deploying portion 51 and the arm R1 overlap in the front-rear direction.

With reference to FIG. 5, the length L1 of the downwardly deploying portion 51 in the deploying direction is shorter than the length L2 of the upwardly deploying portion 43 in the deploying direction.

With the airbag 42 deployed, the airbag 42 surrounds the occupant R and is in close contact with the occupant R.

Specifically, the upwardly deploying portion 43 is in contact with the torso R3 from the front side and protects the torso R3.

The left and right first deploying portions 50 cover the upper arms of the arms R1 from above and protect the arms R1.

The left and right downwardly deploying portions 51 cover the upper arms of the arms R1 from the rear and protect the arms R1.

The airbag 42 wraps around the arms R1 in such a way that: each first deploying portion 50 covers the arm R1 from above; and each lateral side portion of the upwardly deploying portion 43 and the downwardly deploying portion 51 sandwich the arm R1 therebetween. Therefore, the airbag 42 can be properly in close contact with the occupant R. The first deploying portion 50 and the downwardly deploying portion 51 on the left side wrap around the left arm R1, and the first deploying portion 50 and the downwardly deploying portion 51 on the right side wrap around the right arm R1.

Furthermore, each first deploying portion 50 has a rod shape that branches from the upper end portion 43b of the upwardly deploying portion 43, and the downwardly deploying portion 51 has a rod shape continuous from the first deploying portion 50. This reduces the capacity of the first deploying portion 50 and the downwardly deploying portion 51, allowing the first deploying portion 50 and the downwardly deploying portion 51 to be deployed quickly. Furthermore, since the first deploying portion 50 and the downwardly deploying portion 51 are rod-shaped, the first deploying portion 50 and the downwardly deploying portion 51 are easily wrapped around an arm R1.

The airbag device 40 is provided with a separating mechanism 49 (FIG. 1) that separates the airbag 42 from the inflator 41 after the airbag 42 is deployed. The separating mechanism 49 is operated, for example, by the pressure of gas within the airbag 42, to separate the airbag 42 from the inflator 41. Alternatively, the separating mechanism 49 may melt part of the airbag 42 with heat to separate the airbag 42 from the inflator 41.

When the inflator 41 operates and the airbag 42 is deployed, the airbag 42 comes into close contact with the occupant R and is separated from the inflator 41. Therefore, after the airbag 42 is deployed, the airbag 42 is prevented from being pulled by the inflator 41 and being shifted from the occupant R.

The separating mechanism 49 includes a check valve (not shown) that suppresses the outflow of gas from the separated airbag 42. Therefore, after being separated, the airbag 42 maintains the inflated state and is properly in close contact with the occupant R.

As described above, according to the embodiment to which the present invention is applied, the saddled vehicle 10 includes the seat 17 for an occupant and the airbag 42 provided in front of the seat 17; the airbag 42 includes an upwardly deploying portion 43 that is deployed upward when deployed, the first deploying portions 50 that extend from the upper part of the upwardly deploying portion 43 to the rear and outer lateral side of the upwardly deploying portion 43 when deployed, and the downwardly deploying portions 51 that respectively bend and extend downward from each first deploying portion 50 when deployed.

This configuration has the first deploying portions 50 that extend from the upper part of the upwardly deploying portion 43 and the downwardly deploying portions 51 that respectively extend downward from each first deploying portion 50, allowing the first deploying portions 50 and the downwardly deploying portions 51 to be small and allowing the airbag 42 to be compact. Additionally, this configuration allows the airbag 42 to be properly in close contact with the occupant R so as to wrap around the occupant R with the upwardly deploying portion 43, the first deploying portions 50, and the downwardly deploying portions 51.

Furthermore, the length L1 of each downwardly deploying portion 51 in the deploying direction is shorter than the length L2 of the upwardly deploying portion 43 in the deploying direction.

This configuration has the long upwardly deploying portion 43, allowing the occupant R to be effectively protected with the upwardly deploying portion 43. Furthermore, this configuration has the short downwardly deploying portion 51, allowing the downwardly deploying portion 51 to have a capacity that is necessary and sufficient for the airbag 42 to be in close contact with the occupant R and allowing the first deploying portion 50 and the downwardly deploying portion 51 to be deployed quickly.

Furthermore, the inflator connecting portions 44 that are the inlets of gas that deploy the airbag 42 are provided in the upwardly deploying portion 43, and the gas flows upward in the upwardly deploying portion 43 and flows into the first deploying portions 50.

This configuration allows the upwardly deploying portion 43 and the first deploying portions 50 to be efficiently deployed by the gas flowing upward in the upwardly deploying portion 43.

Additionally, each first deploying portion 50 extends rearward and outward from the upwardly deploying portion 43.

This configuration allows the first deploying portion 50 to be deployed rearward while avoiding the head R4 of the occupant R, allowing the first deploying portion 50 and the downwardly deploying portion 51 to be properly in close contact with the occupant R. Furthermore, this configuration allows the first deploying portion 50 to protect the lateral side region of the head R4 of the occupant R.

Furthermore, the first deploying portions 50 branch from the upper end portion 43b of the upwardly deploying portion 43, to be provided in a pair of left and right. This configuration has the first deploying portions 50 that branch from the upper end portion 43b of the upwardly deploying portion 43, allowing the first deploying portions 50 to be compact. Furthermore, this configuration allows the airbag 42 to be properly in close contact with the occupant R with the pair of left and right first deploying portions 50.

Furthermore, each first deploying portion 50 has a rod shape that is thinner than the upwardly deploying portion 43.

This configuration has the first deploying portion 50 that is rod-shaped, allowing the first deploying portion 50 to secure a clearance with the surroundings. This allows the first deploying portion 50 to be deployed smoothly and allows the first deploying portion 50 to facilitate close contact with the occupant R so as to wrap around the occupant R.

Furthermore, an inflator 41 that jets gas into the airbag 42 to deploy the airbag 42 is connected to the airbag 42, and a separating mechanism 49 is provided that separates the airbag 42 from the inflator 41 after the airbag 42 is deployed.

This configuration causes the airbag 42 to be separated from the inflator 41 after the airbag 42 is deployed, preventing the airbag 42 from being shifted downward by the inflator 41 after the airbag 42 is deployed. Therefore, the airbag 42 can be properly in close contact with the occupant R. Furthermore, the airbag 42 can be separated while grasping the occupant R with the airbag 42.

Furthermore, the upwardly deploying portion 43 is deployed upward along the front surface of the torso R3 of the occupant R sitting on the seat 17; each first deploying portion 50 covers the arm R1 of the occupant R, sitting on the seat 17 and grasping the handle 21 for steering, from above; and each downwardly deploying portion 51 sandwiches the arm R1 between the downwardly deploying portion 51 and the upwardly deploying portion 43.

This configuration allows the airbag 42 to be properly in close contact with the occupant R so as to cause the upwardly deploying portion 43, the first deploying portions 50, and the downwardly deploying portions 51 to wrap around the arms R1 of the occupant R.

Note that the above embodiment shows an aspect to which the present invention is applied, and the present invention is not limited to the above embodiment.

In the above embodiment, the airbag 42 is described as being provided in front of the seat 17, but the present invention is not limited to this. The airbag 42 may be provided in the front part of the seat 17 and in front of the seating position of the occupant R. Furthermore, the airbag device 40 may be built in the seat 17 to be disposed.

Furthermore, in the above embodiment, the partition portion 47 is described as being provided only in the rear part in the upwardly deploying portion 43, but the present invention is not limited to this. The partition portion 47 may extend from the rear surface 43a to the front surface of the upwardly deploying portion 43 so as to completely partition the upwardly deploying portion 43 into the one-side upwardly deploying portion 45 and the other-side upwardly deploying portion 46. Furthermore, the partition portion 47 may be provided only in the front part in the upwardly deploying portion 43.

Furthermore, the first deploying portions 50 and the downwardly deploying portion 51 are described as each being provided in a pair of left and right, but there may be a first deploying portion 50 and a downwardly deploying portion 51, each of which is provided on either of the left and right.

Furthermore, in the above embodiment, the first deploying portions 50 are described as branching from the upper end portion 43b of the upwardly deploying portion 43, but the present invention is not limited to this. Each first deploying portion 50 just needs to branch from the upper part of the upwardly deploying portion 43, and may branch from a position below the upper end portion 43b in the upper part of the upwardly deploying portion 43.

Additionally, in the embodiment described above, a motorcycle is described as an example of the saddled vehicle 10, but the present invention is not limited to this, and the present invention is applicable to a three-wheel saddled vehicle having two front wheels or two rear wheels and a saddled vehicle having four or more wheels.

Second Embodiment

A second embodiment to which the present invention is applied will be described below with reference to FIGS. 7 and 8. In the second embodiment, the same reference signs are given to the portions configured similarly to the portions in the above embodiment (first embodiment), and the description of the portions will be omitted.

The second embodiment differs from the above embodiments in the deploying directions of the first deploying portion 250 when deployed.

Figure 7:
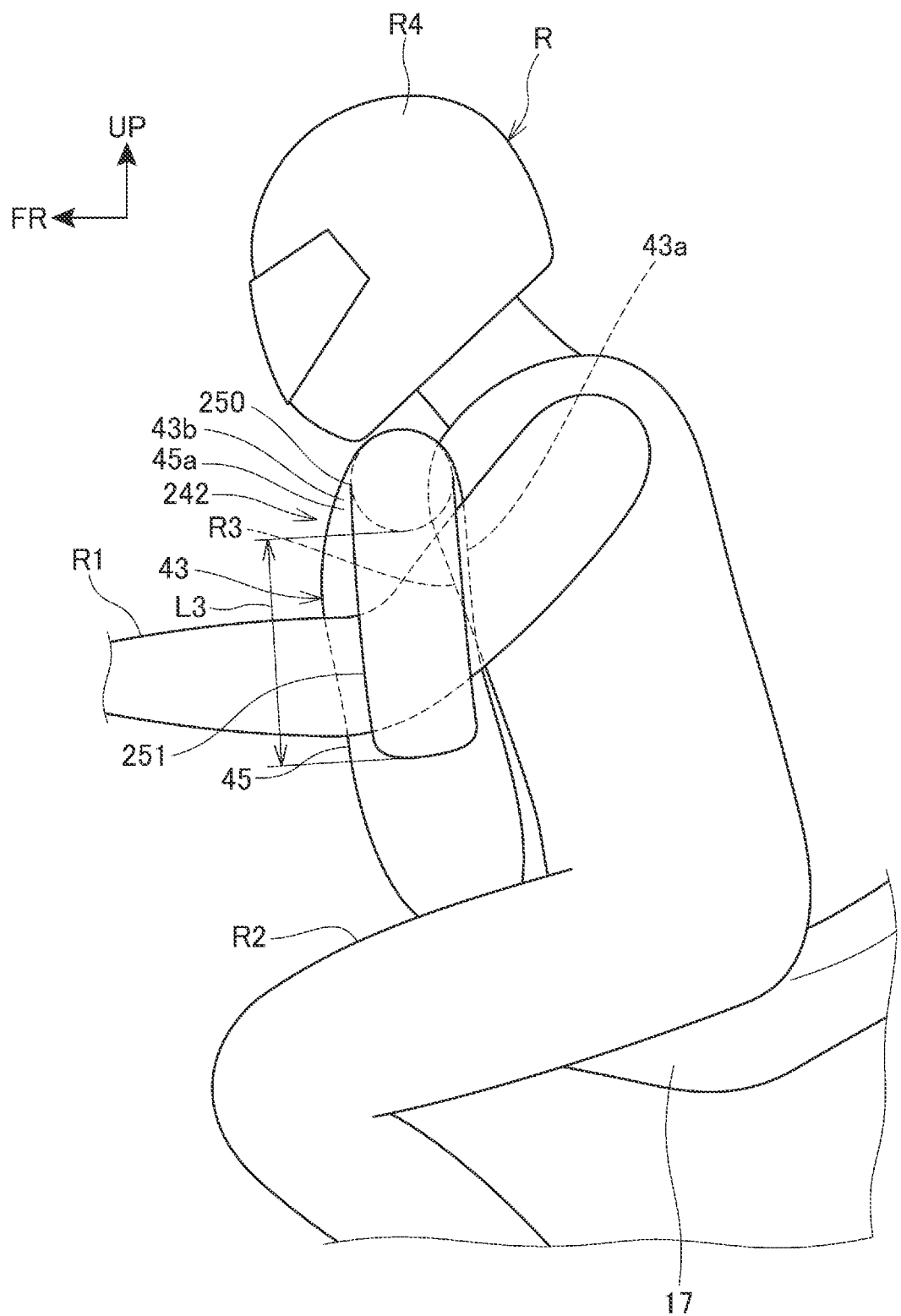
FIG. 7 is a left side view showing a state in which an airbag of a second embodiment is deployed to protect an occupant.
Figure 8:
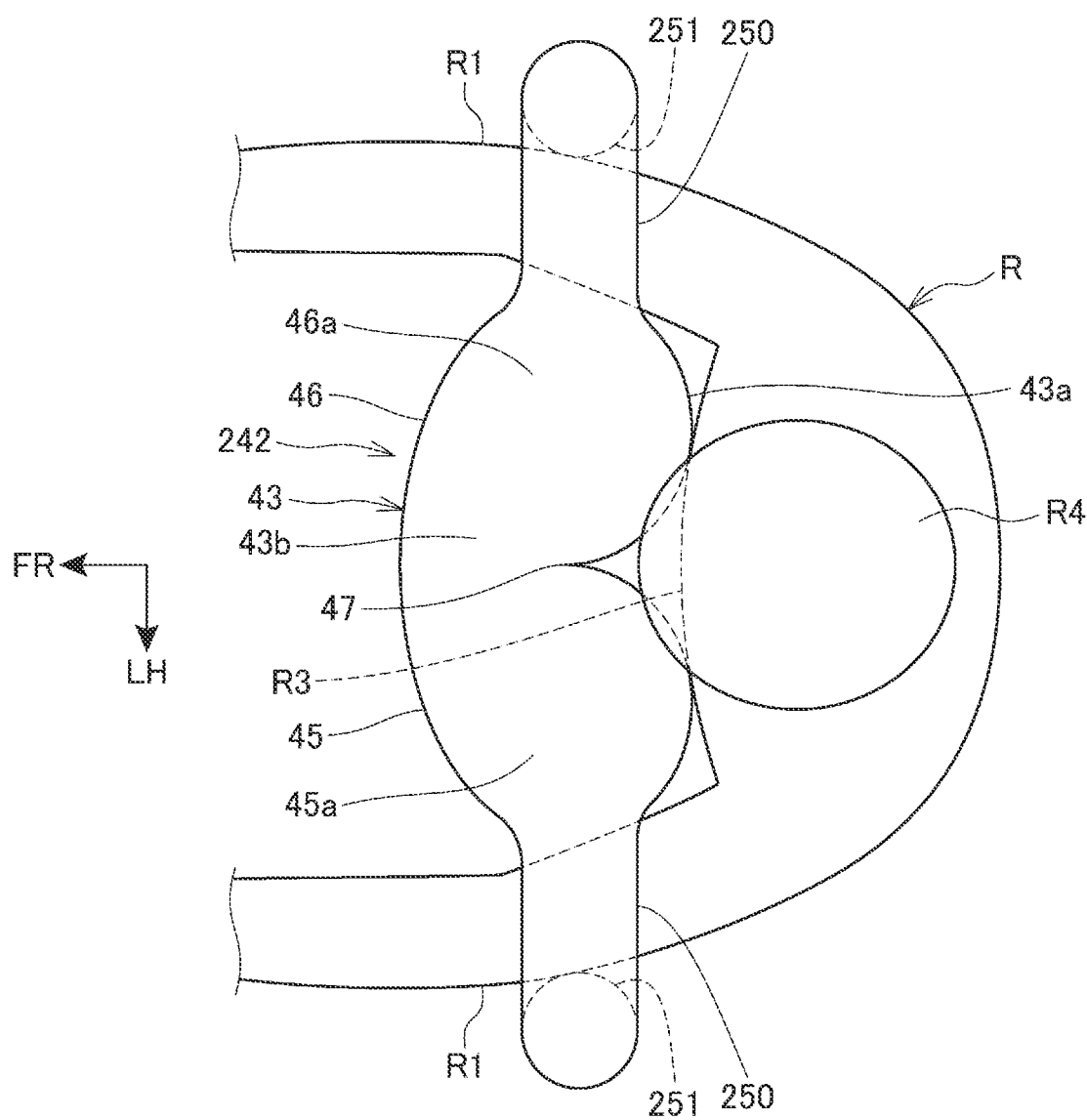
FIG. 8 is a plan view of the state, seen from the upper side, in which the airbag is deployed to protect the occupant.

FIG. 7 is a left side view showing a state in which an airbag 242 of the second embodiment is deployed to protect the occupant R. FIG. 8 is a plan view of the state, seen from the upper side, in which the airbag 242 is deployed to protect the occupant R.

The airbag 242 is stored in the airbag storage portion 29a (FIG. 1). The airbag 242 is connected to the inflator 41 via separating mechanism 49.

The airbag 242 includes an upwardly deploying portion 43, a pair of left and right first deploying portions 250 that branch from the upper part of the upwardly deploying portion 43 and extend toward outer lateral side, and a pair of left and right downwardly deploying portions 251 that respectively bend and extend downward from each first deploying portion 250.

The first deploying portions 250 are provided in a pair of left and right at the upper end portion 43b of the upwardly deploying portion 43. Each first deploying portion 250 extends outward in the vehicle width direction from the upper end portion 43b of the upwardly deploying portion 43. The first deploying portion 250 extends directly laterally relative to the upwardly deploying portion 43.

Specifically, one (left side) first deploying portion 250 extends outward in the vehicle width direction from the upper end portion 45a of the one-side upwardly deploying portion 45.

The other (right side) first deploying portion 250 extends outward in the vehicle width direction from the upper end portion 46a of the other-side upwardly deploying portion 46.

The first deploying portion 250 has a rod shape that is thinner than the upwardly deploying portion 43. The proximal end portion of the first deploying portion 250 communicates with the inside of the upwardly deploying portion 43.

Each first deploying portion 250 extends outward in the vehicle width direction from the upper end portion 43b of the upwardly deploying portion 43 located in front of the upper part of the torso R3, and extends to the outer lateral side of the arm R1 through above the arm R1 of the occupant R.

Specifically, the first deploying portion 250 extends outward in the vehicle width direction through above the upper arm of the arm R1 of the occupant R sitting on the seat 17 and grasping the handle 21. In other words, the first deploying portion 250 covers the upper arm of the arm R1 from above.

Each downwardly deploying portion 251 bends and extends downward from the outer end portion in the vehicle width direction of the first deploying portion 250. The downwardly deploying portion 251 has a rod shape that extends continuously from the first deploying portion 250 and has a rod shape that is thinner than the upwardly deploying portion 43. The downwardly deploying portion 251 is located on the outer side in the vehicle width direction relative to the upwardly deploying portion 43. The downwardly deploying portion 251 extends downward through the outer lateral side of the arm R1, and covers the arm R1 from the outer side in the vehicle width direction.

As shown in FIG. 7, each downwardly deploying portion 251 extends downward below the arm R1 at a portion where the downwardly deploying portion 251 and the arm R1 overlap in the vehicle width direction.

The length L3 of the downwardly deploying portion 251 in the deploying direction is shorter than the length L2 (FIG. 5) of the upwardly deploying portion 43 in the deploying direction.

With the airbag 242 deployed, the airbag 242 surrounds the occupant R and is in close contact with the occupant R.

Specifically, the upwardly deploying portion 43 is in contact with the torso R3 from the front side and protects the torso R3.

The left and right first deploying portions 250 respectively cover each upper arm of the arm R1 from above and protect the arms R1.

The left and right downwardly deploying portions 251 respectively cover each upper arm of the arm R1 from the outer side in the vehicle width direction and protect the arms R1.

The airbag 242 wraps around the arms R1 in such a way that: each first deploying portion 250 cover the arm R1 from above; and each lateral side portion of the upwardly deploying portion 43 and the downwardly deploying portion 251 sandwich the arm R1 therebetween. Therefore, the airbag 242 can be properly in close contact with the occupant R. The first deploying portion 250 and the downwardly deploying portion 251 on the left side wrap around the left arm R1, and the first deploying portion 250 and the downwardly deploying portion 251 on the right side wrap around the right arm R1. Note that the first deploying portions 250 and the downwardly deploying portions 251 may wrap around a portion of the arm R1 in front of the upper arm.

As described above, according to the second embodiment to which the present invention is applied, the saddled vehicle 10 includes the seat 17 for an occupant and the airbag 242 provided in front of the seat 17; the airbag 242 includes an upwardly deploying portion 43 that is deployed upward when deployed, the first deploying portions 250 that extend from the upper part of the upwardly deploying portion 43 to the outer lateral side of the upwardly deploying portion 43 when deployed, and the downwardly deploying portions 251 that respectively bend and extend downward from each first deploying portion 250 when deployed.

This configuration has the first deploying portions 250 that extend from the upper part of the upwardly deploying portion 43 and the downwardly deploying portions 251 that respectively extend downward from each first deploying portion 250, allowing the first deploying portions 250 and the downwardly deploying portions 251 to be small and allowing the airbag 242 to be compact. Additionally, this configuration allows the airbag 242 to be properly in close contact with the occupant R so as to wrap around the occupant R with the upwardly deploying portion 43, the first deploying portions 250, and the downwardly deploying portions 251.

Third Embodiment

A third embodiment to which the present invention is applied will be described below with reference to FIG. 9. In the third embodiment, the same reference signs are given to the portions configured similarly to the portions in the above embodiment (first embodiment), and the description of the portions will be omitted.

The third embodiment differs from the above embodiments in the deploying directions of the first deploying portion 350 when deployed.

Figure 9:
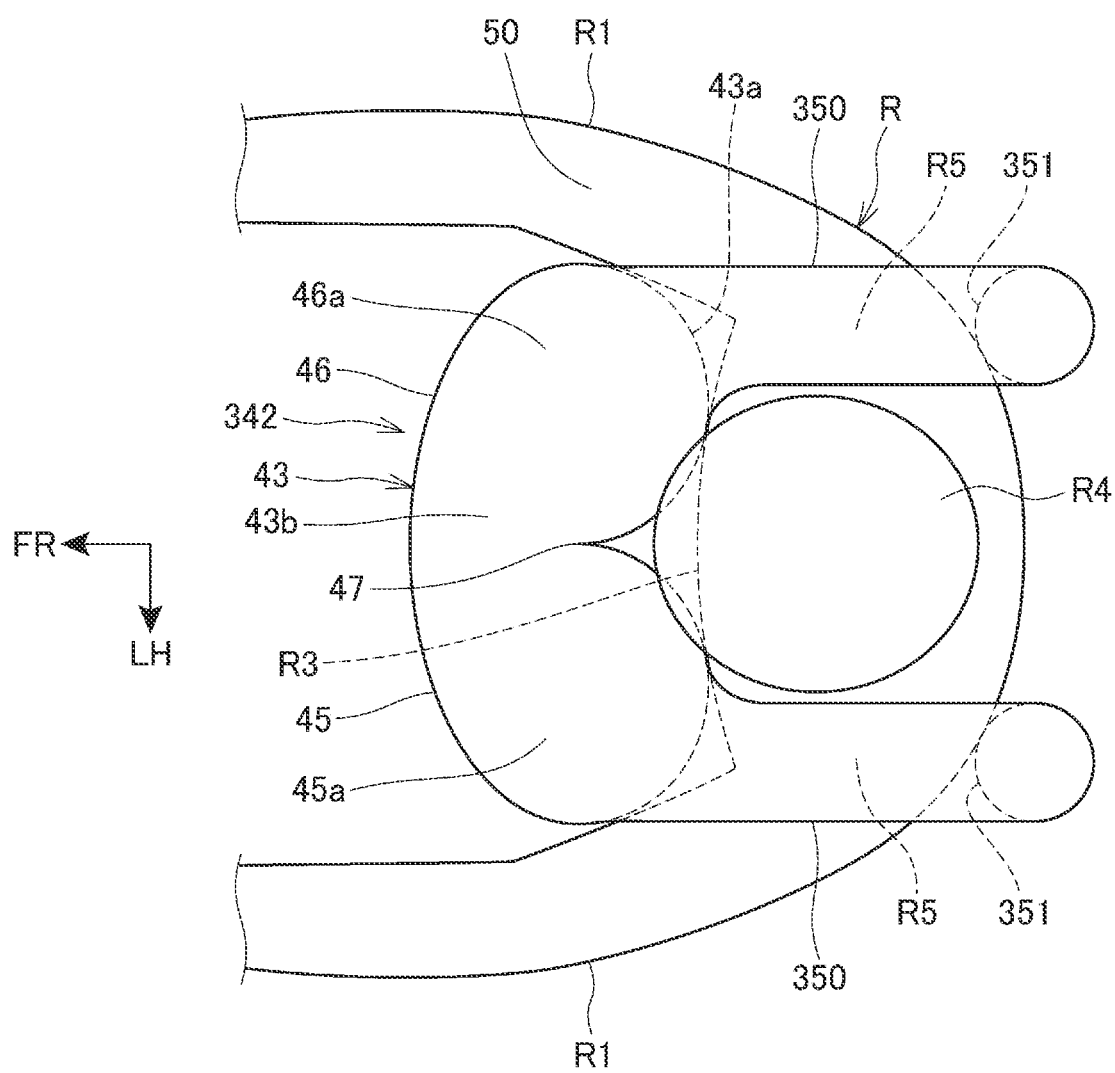
FIG. 9 is a plan view of a state, seen from the upper side, in which an airbag of a third embodiment is deployed to protect an occupant.

FIG. 9 is a plan view of a state, seen from the upper side, in which an airbag 342 of the third embodiment is deployed to protect the occupant R.

The airbag 342 is stored in the airbag storage portion 29a (FIG. 1). The airbag 342 is connected to the inflator 41 via separating mechanism 49.

The airbag 342 includes an upwardly deploying portion 43, a pair of left and right first deploying portions 350 that branch from the upper part of the upwardly deploying portion 43 and extend rearward, and a pair of left and right downwardly deploying portions 351 that respectively bend and extend downward from each first deploying portion 350.

The first deploying portions 350 are provided in a pair of left and right at the upper end portion 43b of the upwardly deploying portion 43. Each first deploying portion 350 extends rearward from the upper end portion 43b of the upwardly deploying portion 43. The first deploying portion 50 extends directly behind the upwardly deploying portion 43.

Specifically, one (left side) first deploying portion 350 extends rearward from the upper end portion 45a of the one-side upwardly deploying portion 45.

The other (right side) first deploying portion 350 extends rearward from the upper end portion 46a of the other-side upwardly deploying portion 46.

The first deploying portion 350 has a rod shape that is thinner than the upwardly deploying portion 43. The proximal end portion of the first deploying portion 350 communicates with the inside of the upwardly deploying portion 43.

Each first deploying portion 350 extends rearward from the upper end portion 43b of the upwardly deploying portion 43 located in front of the upper part of the torso R3, and extends behind the shoulder R5 through the outer lateral side of the head R4 of the occupant R and the upper side of the shoulder R5 of the occupant R.

Specifically, the first deploying portion 350 extends rearward through directly above the shoulder R5 of the occupant R sitting on the seat 17 and grasping the handle 21. In other words, the first deploying portion 350 covers the shoulder R5 from above.

Each downwardly deploying portion 351 bends and extends downward from the rear end portion of the first deploying portion 350. The downwardly deploying portion 351 has a rod shape that extends continuously from the first deploying portion 350 and has a rod shape that is thinner than the upwardly deploying portion 43. The downwardly deploying portion 251 is located behind the upwardly deploying portion 43, and positionally coincides with the upper part of the upwardly deploying portion 43 from the rear in a front view. The downwardly deploying portion 251 extends downward through behind the shoulder R5, and covers the upper part of the torso R3 including the shoulder R5 from the rear.

The length of the downwardly deploying portion 351 in the deploying direction (up-down direction) is shorter than the length L2 (FIG. 5) of the upwardly deploying portion 43 in the deploying direction.

With the airbag 342 deployed, the airbag 342 surrounds the occupant R and is in close contact with the occupant R.

Specifically, the upwardly deploying portion 43 is in contact with the torso R3 from the front side and protects the torso R3.

The left and right first deploying portions 350 cover the shoulders R5 from above and protect the shoulders R5.

The left and right downwardly deploying portions 351 cover the shoulders R5 from the rear and protect the shoulders R5.

The airbag 342 wraps around the shoulders R5 in such a way that: each first deploying portion 350 cover the shoulder R5 from above; and the rear surface 43a of the upwardly deploying portion 43 and each downwardly deploying portion 351 sandwich the shoulder R5 therebetween. Therefore, the airbag 342 can be properly in close contact with the occupant R. The first deploying portion 350 and the downwardly deploying portion 351 on the left side wrap around the left shoulder R5, and the first deploying portion 350 and the downwardly deploying portion 351 on the right side wrap around the right shoulder R5.

As described above, according to the third embodiment to which the present invention is applied, the saddled vehicle 10 includes the seat 17 for an occupant and the airbag 342 provided in front of the seat 17; the airbag 342 includes an upwardly deploying portion 43 that is deployed upward when deployed, the first deploying portions 350 that extend from the upper part of the upwardly deploying portion 43 to the rear side of the upwardly deploying portion 43 when deployed, and the downwardly deploying portions 351 that respectively bend and extend downward from each first deploying portion 350 when deployed.

This configuration has the first deploying portions 350 that extend from the upper part of the upwardly deploying portion 43 and the downwardly deploying portions 351 that respectively extend downward from each first deploying portion 350, allowing the first deploying portions 350 and the downwardly deploying portions 351 to be small and allowing the airbag 342 to be compact. Additionally, this configuration allows the airbag 342 to be properly in close contact with the occupant R so as to wrap around the occupant R with the upwardly deploying portion 43, the first deploying portions 350, and the downwardly deploying portions 351.

Fourth Embodiment

A fourth embodiment to which the present invention is applied will be described below with reference to FIG. 10. In the fourth embodiment, the same reference signs are given to the portions configured similarly to the portions in the above embodiment (first embodiment), and the description of the portions will be omitted.

The fourth embodiment differs from the above embodiments in that the airbag device 40 is mounted on a scooter saddled vehicle 410.

Figure 10:
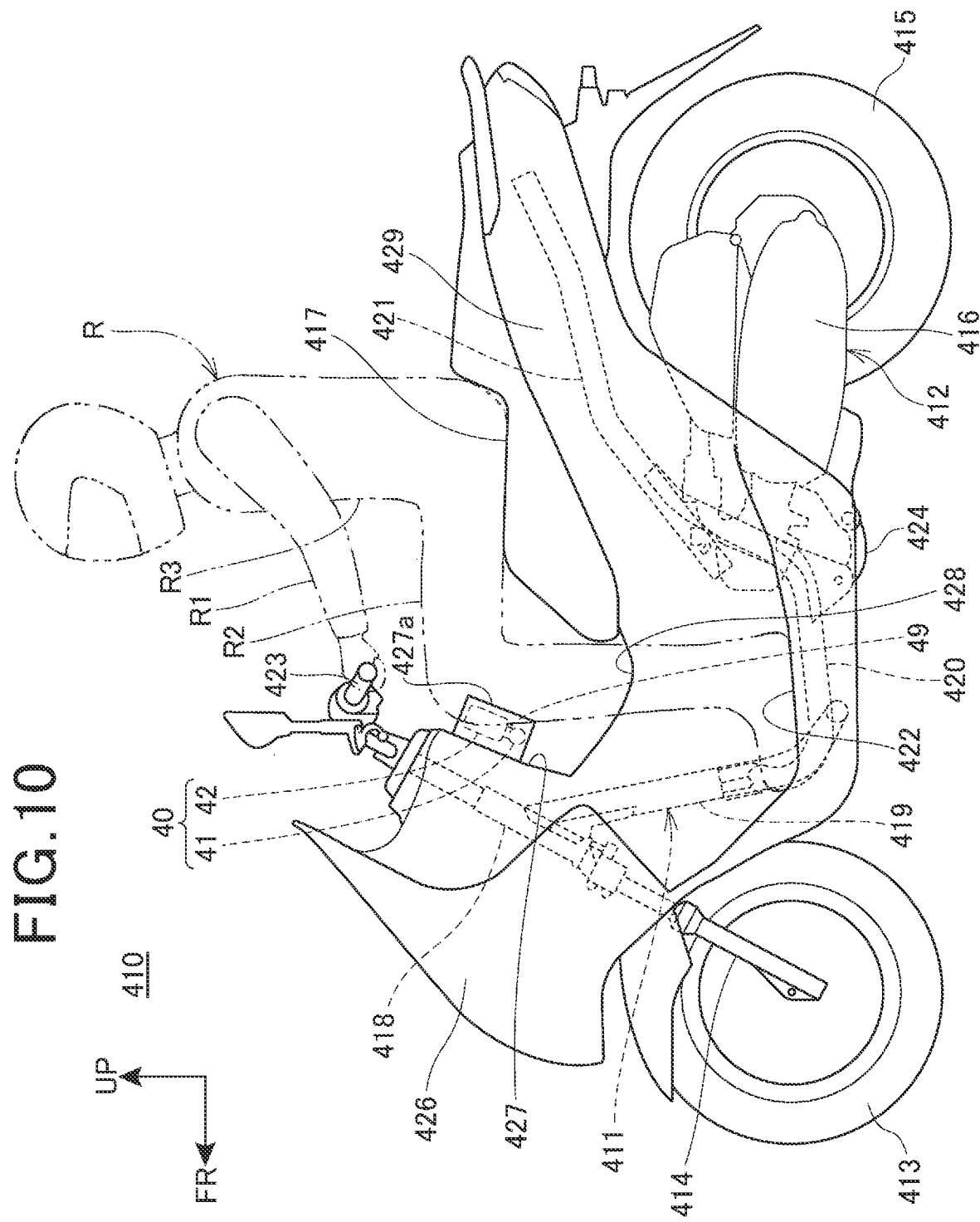
FIG. 10 is a left side view of a saddled vehicle according to a fourth embodiment.

FIG. 10 is a left side view of a saddled vehicle 410 according to the fourth embodiment.

The saddled vehicle 410 is a vehicle that includes a vehicle body frame 411, a power unit 412 supported on the vehicle body frame 411, a front fork 414 that supports a front wheel 413 in a steerable manner, a swing arm 416 that supports a rear wheel 415, and a seat 417 for an occupant.

The saddled vehicle 410 is a scooter motorcycle in which an occupant R sits astride a seat 417. The seat 417 is provided above the rear part of the vehicle body frame 411. A floor-like step floor 422 on which the occupant R puts his or her feet is provided below the front of the seat 417.

The vehicle body frame 411 includes a head pipe 418 provided at the front end portion of the vehicle body frame 411, a down frame 419 extending downward from the head pipe 418, a lower frame 420 extending rearward from the lower end portion of the down frame 419, and a seat frame 421 extending rearward and upward from the rear end portion of the lower frame 420. The seat 417 is supported on the seat frame 421.

The front fork 414 is supported on the head pipe 418 so as to be steerable left and right. A handle 423 for steering that the occupant R grasps is mounted at an upper end portion of the front fork 414.

The power unit 412 is a unit swing engine in which an engine (internal combustion engine), which is a drive source for the rear wheel 415, and a swing arm 416 are integrally provided. The power unit 412 is located directly below the seat 417 in a vehicle side view.

The power unit 412 is connected to the rear part of the vehicle body frame 411 via a link member 424 connected to the front part of the power unit 412, and swings up and down around the link member 424.

The saddled vehicle 410 has a vehicle body cover including: a front cover 426 that covers the front end portion of the vehicle body frame 411 from the front, and left and right lateral sides; an inner cover 427 that covers the head pipe 418 and the down frame 419 from the rear; a center tunnel portion 428, located below the seat 417 and between the down frame 419 and the seat frame 421, that covers the vehicle body from above and both left and right lateral sides; and a rear cover 429 that covers the vehicle body below the seat 417 behind the center tunnel portion 428, from the left and right lateral sides.

The inner cover 427 is a leg shield that covers the legs R2 of the occupant R, sitting on the seat 417, from the front side.

The center tunnel portion 428 is located behind inner cover 427. The center tunnel portion 428 has a tunnel shape that protrudes upward from the step floor 422 at the central portion in the vehicle width direction. The center tunnel portion 428 is a tunnel-shaped cover that extends in the front-rear direction, and has components, such as a fuel tank, disposed in the center tunnel portion 428.

The occupant R places his or her feet on the step floor 422, respectively on the left and right sides over the center tunnel portion 428.

The airbag device 40 is attached to the rear surface portion of the inner cover 427 in front of the seat 417 and above the center tunnel portion 428. The airbag device 40 is disposed at the center in the vehicle width direction. The airbag device 40 is provided at a position overlapping the head pipe 418 from the rear in FIG. 10, but the airbag device 40 may be disposed at a position higher than the head pipe 418.

Specifically, an airbag storage portion 427a that stores the airbag device 40 is provided above the center tunnel portion 428 and at the upper part of the rear surface of the inner cover 427.

The airbag 42 is deployed toward the occupant R from the airbag storage portion 427a.

In the fourth embodiment, the airbag device 40 is disposed at a position farther from the occupant R than in the structure of the above embodiment (first embodiment). For this reason, the airbag device 40 may be changed in the length or the like so as to be allowed to be properly in close contact with the occupant R sitting on the seat 417.

Furthermore, instead of the airbag 42, the above-described airbag 242 of the second embodiment or the airbag 342 of the third embodiment may be disposed in the airbag storage portion 427a.

Note that the airbag 42 may be stored in the front part of the seat 417 instead of in the airbag storage portion 427a.

Figure 11:
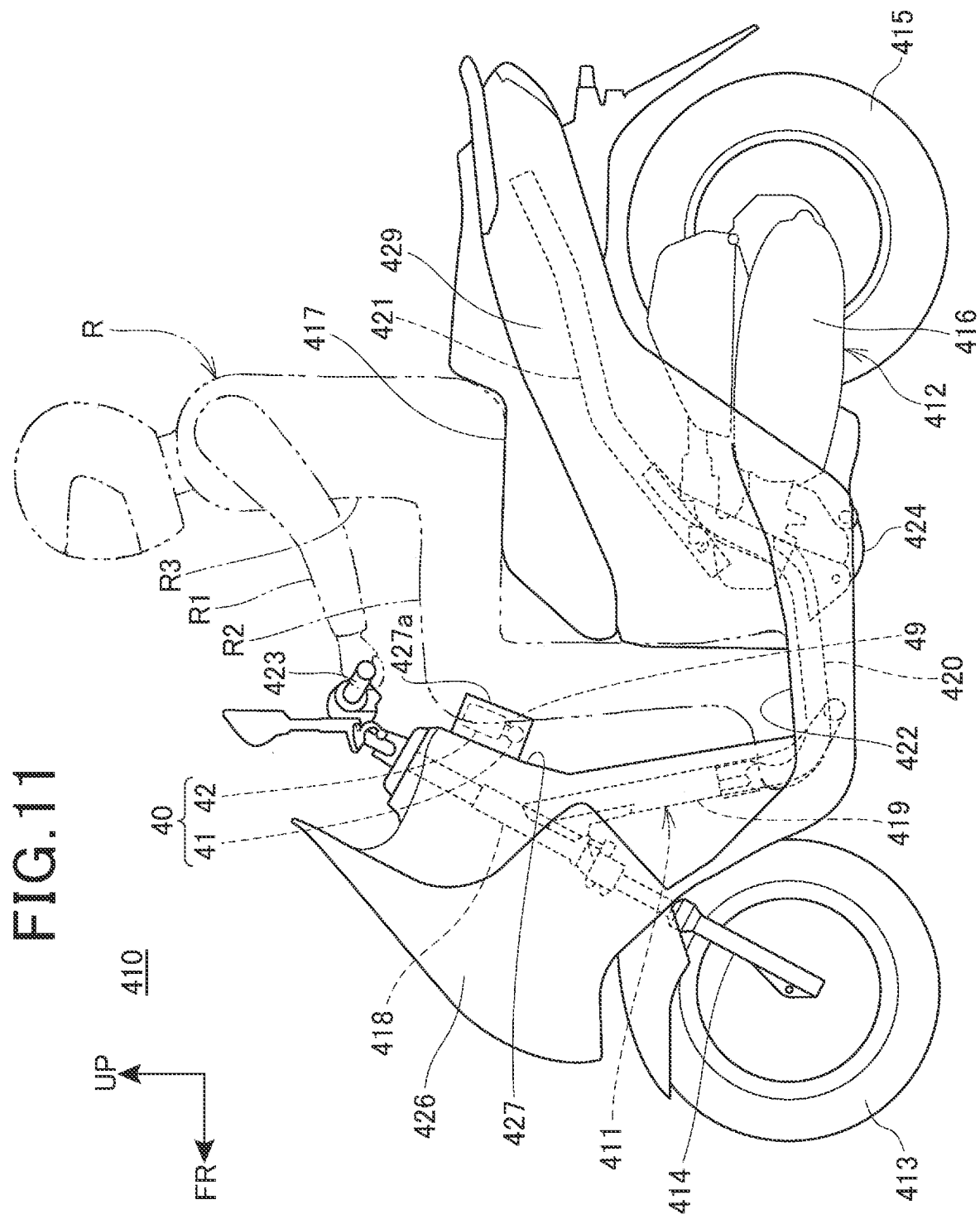
FIG. 11 is a left side view showing a modification of the fourth embodiment.

FIG. 11 is a left side view showing a modification of the fourth embodiment.

As shown in FIG. 11, the saddled vehicle 410 may have the step floor 422 formed as a substantially flat surface spanning the center in the vehicle width direction without including the center tunnel portion 428. In this case as well, the airbag 42 is attached to the upper part of the rear surface portion of the inner cover 427 in front of the seat 417.

Fifth Embodiment

A fifth embodiment to which the present invention is applied will be described below with reference to FIG. 12. In the fifth embodiment, the same reference signs are given to the portions configured similarly to the portions in the above embodiment (first embodiment), and the description of the portions will be omitted.

The fifth embodiment differs from the above embodiments in that the airbag device 40 is mounted on a stand-up vehicle 510.

Figure 12:
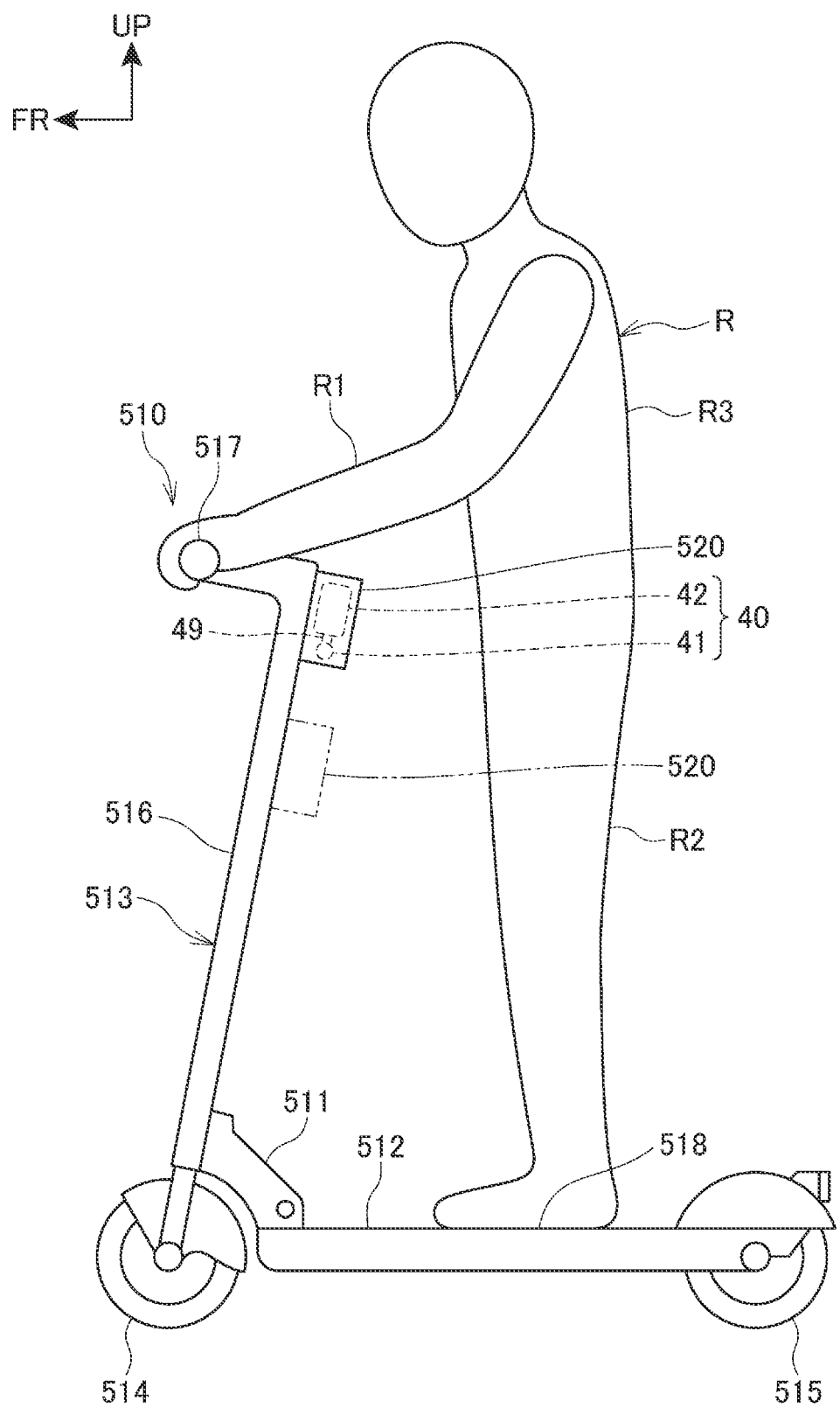
FIG. 12 is a left side view of a stand-up vehicle in a fifth embodiment.

FIG. 12 is a left side view of a stand-up vehicle 510 in the fifth embodiment.

The stand-up vehicle 510 is a vehicle including a vehicle body frame 511, a plate-shaped deck portion 512 on which an occupant R rides, a steering portion 513 supported on the front end portion of the vehicle body frame 511 so as to be steerable left and right, a front wheel 514 supported on the lower end portion of the steering portion 513, and a rear wheel 515 provided at the rear end portion of the vehicle body. The deck portion 512 is supported on the vehicle body frame 511.

The steering portion 513 includes a steering shaft 516 supported on the front end portion of the vehicle body frame 511, and a handle 517 provided at the upper end portion of the steering shaft 516.

The occupant R rides on the stand-up vehicle 510 by standing on the deck portion 512 behind the handle 517 and grasping the handle 517 with his or her hands.

The stand-up vehicle 510 is a so-called kickboard, and is a vehicle on which the occupant R rides in a standing posture.

The riding position 518 of the occupant R is located on the deck portion 512, behind the handle 517 and in front of the rear wheel 515.

A box-shaped airbag storage portion 520 is provided on the rear surface portion of the handle 517.

The airbag device 40 is stored in the airbag storage portion 520.

The airbag storage portion 520 and the airbag device 40 are provided in front of and above the riding position 518.

The airbag 42 is deployed rearward and upward from the airbag storage portion 520, and is in close contact with the occupant R in such a way that the upwardly deploying portion 43, the first deploying portions 50, and the downwardly deploying portions 51 surround the occupant R, similarly to FIG. 3. The first deploying portions 50 and the downwardly deploying portions 51 wrap around the arm R1.

Note that, as shown by the imaginary line in FIG. 12, an airbag storage portion 520 may be provided on the rear surface of the steering shaft 516 below the handle 517, and this airbag storage portion 520 may store the airbag device 40.

Furthermore, instead of the airbag 42, the above-described airbag 242 of the second embodiment or the airbag 342 of the third embodiment may be disposed in the airbag storage portion 520.

As described above, according to the fifth embodiment to which the present invention is applied, the vehicle includes the airbag 42 provided in front of the riding position 518 for the occupant R; the vehicle is a stand-up vehicle 510 in which the occupant R stands to ride on the riding position 518; the airbag 42 includes an upwardly deploying portion 43 that is deployed upward when deployed, the first deploying portions 50 that extend from the upper part of the upwardly deploying portion 43 to the rear and outer lateral side of the upwardly deploying portion 43 when deployed, and the downwardly deploying portions 51 that respectively bend and extend downward from each first deploying portion 50 when deployed.

This configuration has the first deploying portions 50 that extend from the upper part of the upwardly deploying portion 43 and the downwardly deploying portions 51 that respectively extend downward from each first deploying portion 50, allowing the first deploying portions 50 and the downwardly deploying portions 51 to be small and allowing the airbag 42 to be compact. Additionally, this configuration allows the airbag 42 to be properly in close contact with the occupant R so as to wrap around the occupant R with the upwardly deploying portion 43, the first deploying portions 50, and the downwardly deploying portions 51.

Sixth Embodiment

A sixth embodiment to which the present invention is applied will be described below with reference to FIGS. 13 and 14. In the sixth embodiment, the same reference signs are given to the portions configured similarly to the portions in the above embodiment (first embodiment), and the description of the portions will be omitted.

The sixth embodiment differs from the above embodiments in that the airbag 42 is provided in occupant equipment 671 worn by the occupant R.

Figure 13:
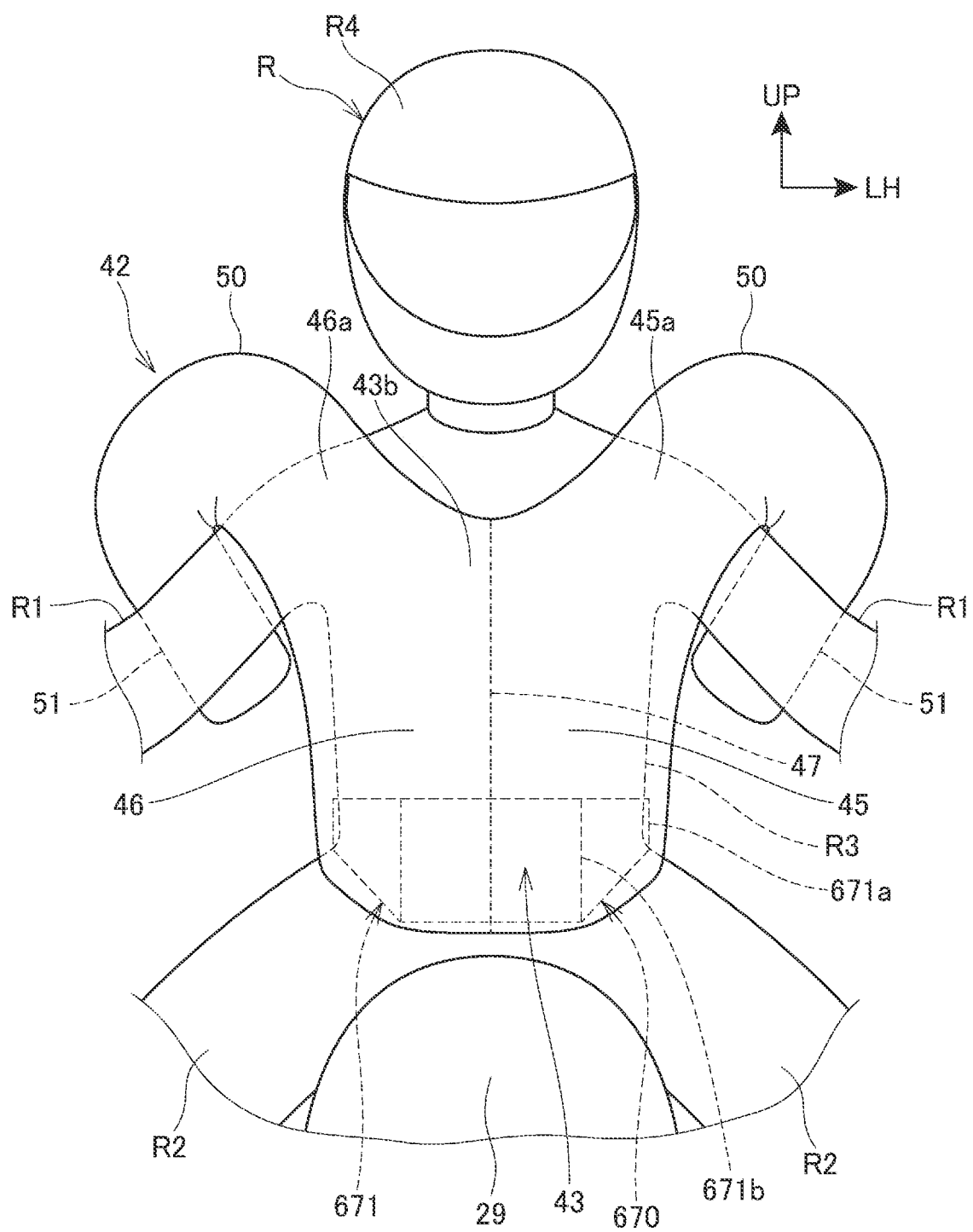
FIG. 13 is a front view of a state, seen from the front side, in which an airbag is deployed to protect an occupant in a sixth embodiment.

FIG. 13 is a front view of a state, seen from the front side, in which an airbag 42 is deployed to protect an occupant R in the sixth embodiment. FIG. 14 is a left side view showing a state in which the airbag 42 is deployed to protect the occupant R.

The occupant-protecting equipment 670 includes occupant equipment 671 worn by the occupant R, and an airbag 42 supported by the occupant equipment 671.

The occupant equipment 671 is a belt that is detachably attached to the lower part of the torso R3.

The occupant equipment 671 includes a belt-shaped belt portion 671a that wraps around the outer periphery of the torso R3, and a case-shaped airbag storage portion 671b provided on the front surface of the belt portion 671a. The airbag storage portion 671b is located in front of the lower part of the torso R3.

The airbag 42 is stored in the airbag storage portion 671b in a folded state. Furthermore, the inflator 41 (FIG. 1) is also stored in the airbag storage portion 671b. The airbag 42 is located in front of the lower part of the torso R3.

The airbag 42 is deployed upward from the airbag storage portion 671b.

With the airbag 42 deployed, the airbag 42 surrounds the occupant R and is in close contact with the occupant R.

Figure 14:
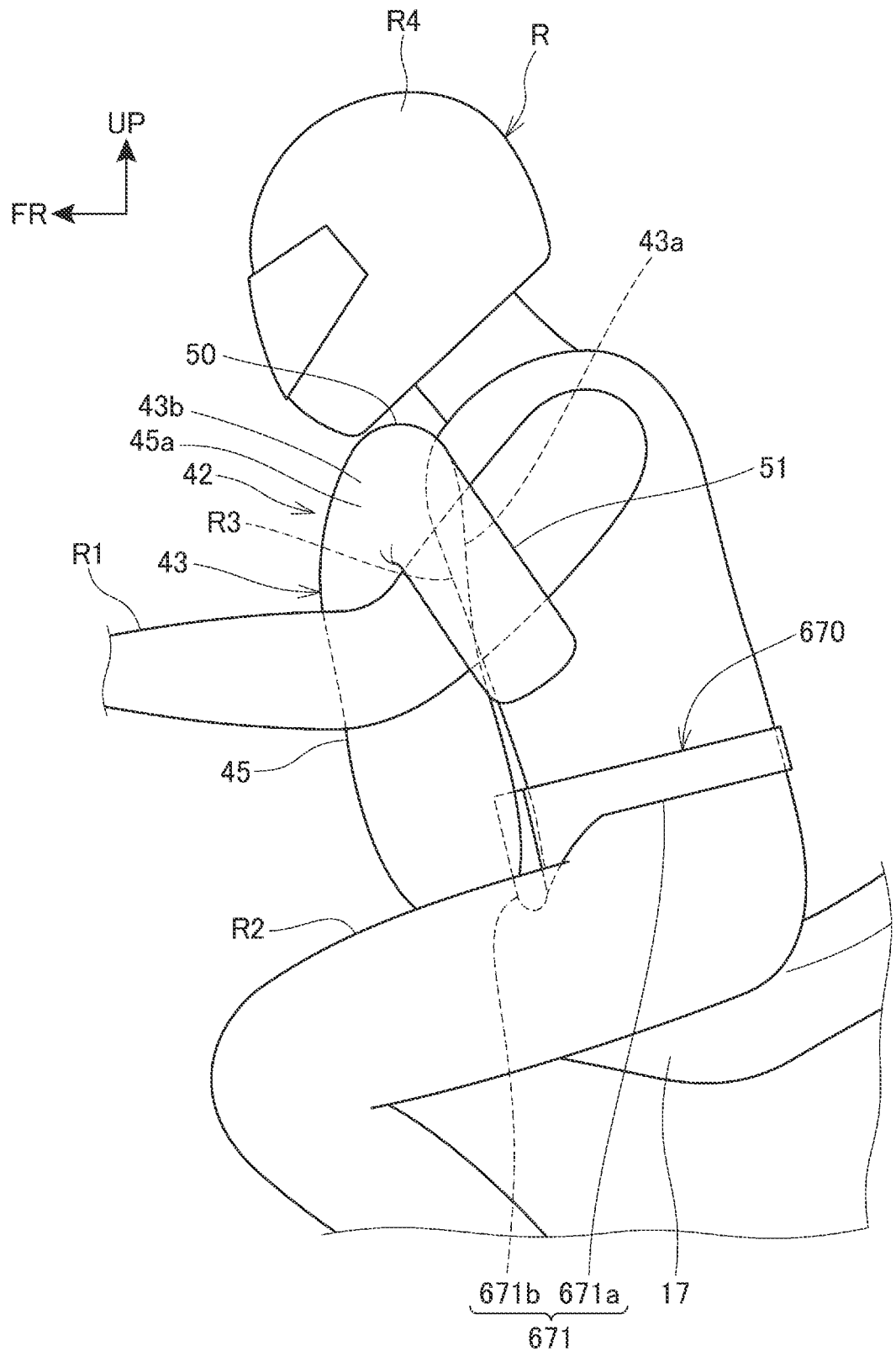
FIG. 14 is a left side view showing the state in which the airbag is deployed to protect the occupant.

The deployed state of the airbag 42 of the occupant equipment 671 shown in FIGS. 13 and 14 is the same as that in the above embodiment (see FIGS. 2 to 4), so a detailed description will be omitted here.

As described above, according to the sixth embodiment to which the present invention is applied, the occupant-protecting equipment 670 includes the occupant equipment 671 worn by the occupant R who rides in the saddled vehicle 10, and the airbag 42; the airbag 42 is supported by the occupant equipment 671 and is located on the front surface side of the torso R3 of the occupant R; and the airbag 42 includes an upwardly deploying portion 43 that is deployed upward when deployed, the first deploying portions 50 that extend from the upper part of the upwardly deploying portion 43 to the rear and outer lateral side of the upwardly deploying portion 43 when deployed, and the downwardly deploying portions 51 that respectively bend and extend downward from each first deploying portion 50 when deployed.

This configuration has the first deploying portions 50 that extend from the upper part of the upwardly deploying portion 43 and the downwardly deploying portions 51 that respectively extend downward from each first deploying portion 50, allowing the first deploying portions 50 and the downwardly deploying portions 51 to be small and allowing the airbag 42 to be compact. Additionally, this configuration allows the airbag 42 to be properly in close contact with the occupant R so as to wrap around the occupant R with the upwardly deploying portion 43, the first deploying portions 50, and the downwardly deploying portions 51. Furthermore, the airbag 42 is stored in the airbag storage portion 671b when not operated, and is deployed when protecting the occupant R. Therefore, air permeability is better than, for example, an airbag that is constantly worn by the occupant R in a deployed state.

Note that in the sixth embodiment, instead of the airbag 42, either the airbag 242 (FIG. 7) or the airbag 342 (FIG. 9) may be provided in the airbag storage portion 671b.

Seventh Embodiment

A seventh embodiment to which the present invention is applied will be described below with reference to FIG. 15. In the seventh embodiment, the same reference signs are given to the portions configured similarly to the portions in the above embodiment (first embodiment), and the description of the portions will be omitted.

The seventh embodiment differs from the above embodiments in that the airbag 42 is provided in occupant equipment 771 worn by the occupant R.

Figure 15:
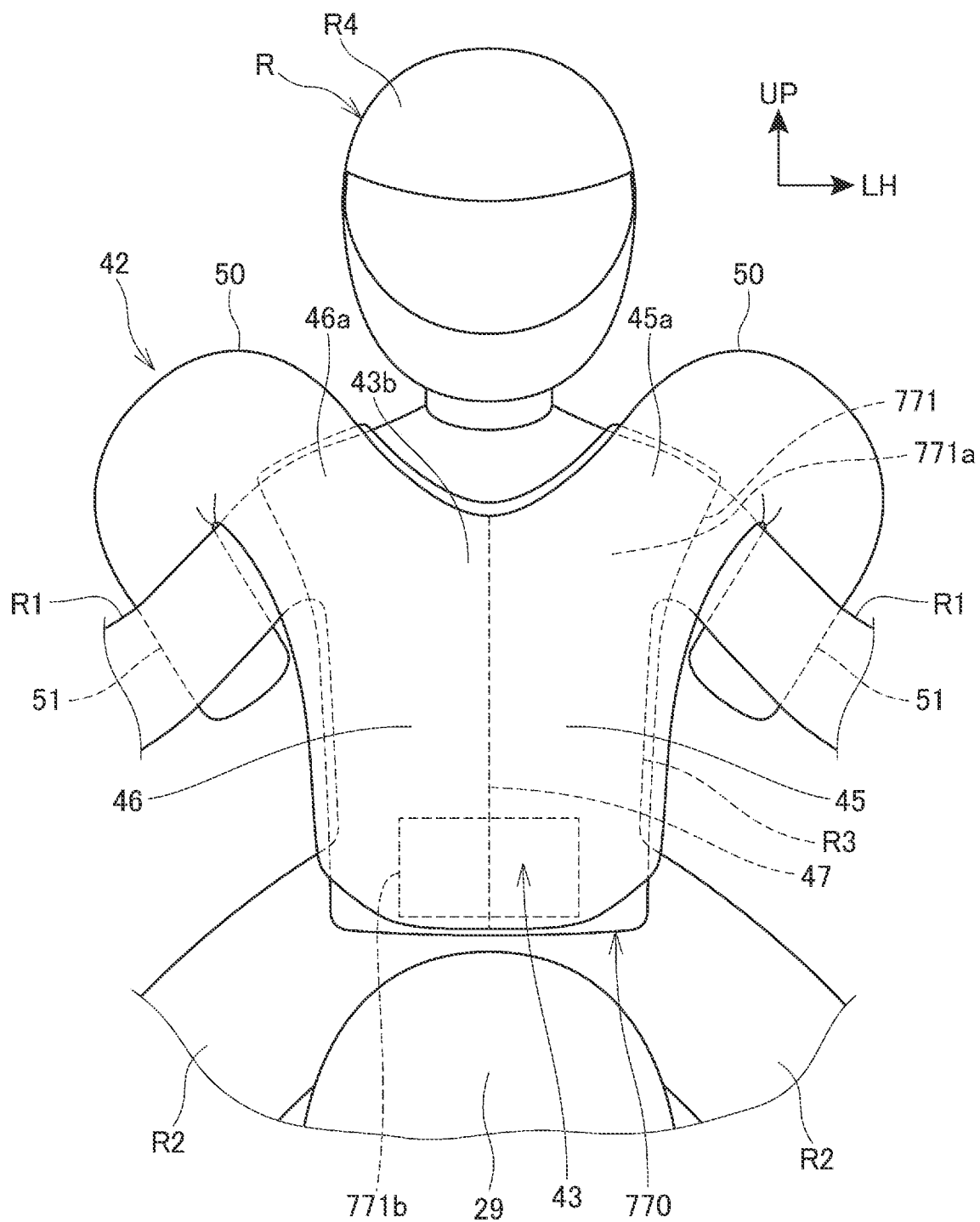
FIG. 15 is a front view of a state, seen from the front side, in which an airbag is deployed to protect an occupant in a seventh embodiment.

FIG. 15 is a front view of a state, seen from the front side, in which an airbag 42 is deployed to protect an occupant R in the seventh embodiment.

The occupant-protecting equipment 770 includes occupant equipment 771 worn by the occupant R, and an airbag 42 supported by the occupant equipment 771.

The occupant equipment 771 is a jacket that is detachably attached to the torso R3. This jacket is, for example, a vest type jacket.

The occupant equipment 771 includes a case-shaped airbag storage portion 771b at the lower part of a jacket front surface portion 771a that covers the torso R3 from the front side. The airbag storage portion 771b is located in front of the lower part of the torso R3.

The airbag 42 is stored in the airbag storage portion 771b in a folded state. Furthermore, the inflator 41 (FIG. 1) is also stored in the airbag storage portion 771b. The airbag 42 is located in front of the lower part of the torso R3.

Note that the airbag storage portion 771b may be a pocket provided in the jacket for the airbag 42. Alternatively, the airbag storage portion 771b may be a fastener such as a button or a zipper that allows the airbag 42 to be attached to the jacket.

The airbag 42 is deployed upward from the airbag storage portion 771b.

With the airbag 42 deployed, the airbag 42 surrounds the occupant R and is in close contact with the occupant R.

The deployed state of the airbag 42 of the occupant equipment 771 shown in FIG. 15 is the same as that in the above embodiment (see FIGS. 2 to 4), so detailed description will be omitted here.

As described above, according to the seventh embodiment to which the present invention is applied, the occupant-protecting equipment 770 includes the occupant equipment 771 worn by the occupant R who rides in the saddled vehicle 10, and the airbag 42; the airbag 42 is supported by the occupant equipment 771 and is located on the front surface side of the torso R3 of the occupant R; the airbag 42 includes an upwardly deploying portion 43 that is deployed upward when deployed, the first deploying portions 50 that extend from the upper part of the upwardly deploying portion 43 to the rear and outer lateral side of the upwardly deploying portion 43 when deployed, and the downwardly deploying portions 51 that respectively bend and extend downward from each first deploying portion 50 when deployed.

This configuration has the first deploying portions 50 that extend from the upper part of the upwardly deploying portion 43 and the downwardly deploying portions 51 that respectively extend downward from each first deploying portion 50, allowing the first deploying portions 50 and the downwardly deploying portions 51 to be small and allowing the airbag 42 to be compact. Additionally, this configuration allows the airbag 42 to be properly in close contact with the occupant R so as to wrap around the occupant R with the upwardly deploying portion 43, the first deploying portions 50, and the downwardly deploying portions 51. Furthermore, the airbag 42 is stored in the airbag storage portion 771b when not operated, and is deployed when protecting the occupant R. Therefore, air permeability is better than, for example, an airbag that is constantly worn by the occupant R in a deployed state.

Note that in the seventh embodiment, instead of the airbag 42, either the airbag 242 (FIG. 7) or the airbag 342 (FIG. 9) may be provided in the airbag storage portion 771b.

Configuration Supported by Above Embodiments

The above embodiments support the following configurations.

Configuration 1

A saddled vehicle includes: a seat for an occupant; and an airbag provided in front of the seat or in a front part of the seat, in which the airbag includes an upwardly deploying portion that is deployed upward when deployed, a first deploying portion that extends laterally outward, rearward, or rearward and outward with respect to the upwardly deploying portion, from an upper part of the upwardly deploying portion when deployed, and a downwardly deploying portion that bends and extends downward from the first deploying portion when deployed.

This configuration has: the first deploying portion that extends from the upper part of the upwardly deploying portion; and the downwardly deploying portion that extends downward from the first deploying portion, allowing the first deploying portion and the downwardly deploying portion to be small and allowing the airbag to be compact. Additionally, this configuration allows the airbag to be properly in close contact with the occupant so as to wrap around the occupant with the upwardly deploying portion, the first deploying portion, and the downwardly deploying portion.

Configuration 2

The saddled vehicle according to Configuration 1, in which a length of the downwardly deploying portion in a deploying direction is shorter than a length of the upwardly deploying portion in a deploying direction.

This configuration has the long upwardly deploying portion, allowing the occupant to be effectively protected with the upwardly deploying portion. Furthermore, this configuration has the short downwardly deploying portion, allowing the downwardly deploying portion to have a capacity that is necessary and sufficient for close contact with the occupant and allowing the first deploying portion and the downwardly deploying portion to be deployed quickly.

Configuration 3

The saddled vehicle according to Configuration 1 or 2, in which an inlet of gas for deploying the airbag is provided in the upwardly deploying portion, and the gas flows upward in the upwardly deploying portion and flows into the first deploying portion.

This configuration allows the upwardly deploying portion and the first deploying portion to be efficiently deployed by the gas flowing upward in the upwardly deploying portion.

Configuration 4

The saddled vehicle according to any of Configurations 1 to 3, in which the first deploying portion extends rearward and outward from the upwardly deploying portion.

This configuration allows the first deploying portion to be deployed rearward while avoiding the head of the occupant, allowing the first deploying portion and the downwardly deploying portion to be properly in close contact with the occupant. Furthermore, this configuration allows the first deploying portion to protect the lateral side regions of the head of the occupant.

Configuration 5

The saddled vehicle according to any of Configurations 1 to 4, in which the first deploying portions branch from an upper end portion of the upwardly deploying portion, to be provided in a pair of left and right.

This configuration has the first deploying portions that branch from the upper end portion of the upwardly deploying portion, allowing the first deploying portions to be compact. Furthermore, this configuration allows the airbag to be properly in close contact with the occupant with the pair of left and right first deploying portions.

Configuration 6

The saddled vehicle according to any of Configurations 1 to 5, in which the first deploying portion has a rod shape that is thinner than the upwardly deploying portion.

This configuration has the first deploying portion that is rod-shaped, allowing the first deploying portion to secure a clearance with the surroundings. This allows the first deploying portion to be deployed smoothly and allows the first deploying portion to facilitate close contact with the occupant so as to wrap around the occupant.

Configuration 7

The saddled vehicle according to any of Configurations 1 to 6, in which an inflator that jets gas into the airbag to deploy the airbag is connected to the airbag, and a separating mechanism is provided that separates the airbag from the inflator after the airbag is deployed.

This configuration causes the airbag to be separated from the inflator after the airbag is deployed, preventing the airbag from being shifted downward by the inflator after the airbag is deployed. Therefore, the airbag can be properly in close contact with the occupant. Furthermore, the airbag can be separated while the airbag grasps the occupant.

Configuration 8

The saddled vehicle according to any of Configurations 1 to 7, in which the upwardly deploying portion is deployed upward along a front surface of a torso of an occupant sitting on the seat, and the first deploying portion covers an arm of the occupant from above, the occupant sitting on the seat and grasping a handle for steering; and the downwardly deploying portion sandwiches the arm between the downwardly deploying portion and the upwardly deploying portion.

This configuration allows the airbag to be properly in close contact with the occupant so as to wrap around the arms of the occupant with the upwardly deploying portion, the first deploying portion, and the downwardly deploying portion.

Configuration 9

The saddled vehicle according to any of Configurations 1 to 7, in which the upwardly deploying portion is deployed upward along a front surface of a torso of an occupant sitting on the seat, and the first deploying portion covers a shoulder of the occupant from above, the occupant sitting on the seat and grasping a handle for steering, and the downwardly deploying portion sandwiches the shoulder between the downwardly deploying portion and the upwardly deploying portion.

This configuration allows the airbag to be properly in close contact with the occupant so as to wrap around the shoulders of the occupant with the upwardly deploying portion, the first deploying portion, and the downwardly deploying portion.

Configuration 10

A vehicle includes an airbag provided in front of a riding position for an occupant, in which the vehicle is a stand-up vehicle on which an occupant stands at the riding position, and the airbag includes an upwardly deploying portion that is deployed upward when deployed, a first deploying portion that extends laterally outward, rearward, or rearward and outward with respect to the upwardly deploying portion, from an upper part of the upwardly deploying portion when deployed, and a downwardly deploying portion that bends and extends downward from the first deploying portion when deployed.

This configuration has: the first deploying portion that extends from the upper part of the upwardly deploying portion; and the downwardly deploying portion that extends downward from the first deploying portion, allowing the first deploying portion and the downwardly deploying portion to be small and allowing the airbag to be compact. Additionally, this configuration allows the airbag to be properly in close contact with the occupant so as to wrap around the occupant with the upwardly deploying portion, the first deploying portion, and the downwardly deploying portion.

Configuration 11

Occupant-protecting equipment includes: occupant equipment worn by an occupant riding on a vehicle; and an airbag, in which the airbag is supported by the occupant equipment and is located on a front surface side of a torso of the occupant, and the airbag includes an upwardly deploying portion that is deployed upward when deployed, a first deploying portion that extends laterally outward, rearward, or rearward and outward with respect to the upwardly deploying portion, from an upper part of the upwardly deploying portion when deployed, and a downwardly deploying portion that bends and extends downward from the first deploying portion when deployed.

This configuration has: the first deploying portion that extends from the upper part of the upwardly deploying portion; and the downwardly deploying portion that extends downward from the first deploying portion, allowing the first deploying portion and the downwardly deploying portion to be small and allowing the airbag to be compact. Additionally, this configuration allows the airbag to be properly in close contact with the occupant so as to wrap around the occupant with the upwardly deploying portion, the first deploying portion, and the downwardly deploying portion.

REFERENCE SIGNS LIST 10, 410 saddled vehicle (vehicle)
17, 417 seat
21, 423 handle
41 inflator
42, 242, 342 airbag
43 upwardly deploying portion
43b upper end portion
44 inflator connecting portion (inlet of gas)
49 separating mechanism
50, 250, 350 first deploying portion
51, 251, 351 downwardly deploying portion
510 stand-up vehicle (vehicle)
518 riding position
670, 770 occupant-protecting equipment
671, 771 occupant equipment
L1, L3 length (length in deploying direction of the downwardly deploying portion)
L2 length (length in deploying direction of upwardly deploying portion)
R occupant
R1 arm
R3 torso
R5 shoulder

The invention claimed is:

1. A saddled vehicle comprising: a seat for an occupant; and an airbag provided in front of the seat or in a front part of the seat, wherein the airbag includes an upwardly deploying portion that is deployed upward when deployed, a first deploying portion that extends laterally outward, or rearward and laterally outward with respect to the upwardly deploying portion, from an upper part of the upwardly deploying portion when deployed, and a downwardly deploying portion that bends and extends downward from the first deploying portion when deployed.

2. The saddled vehicle according to claim 1, wherein a length of the downwardly deploying portion in a deploying direction is shorter than a length of the upwardly deploying portion in a deploying direction.

3. The saddled vehicle according to claim 1, wherein an inlet of gas for deploying the airbag is provided in the upwardly deploying portion, and the gas flows upward in the upwardly deploying portion and flows into the first deploying portion.

4. The saddled vehicle according to claim 1, wherein the first deploying portion extends rearward and laterally outward from the upwardly deploying portion.

5. The saddled vehicle according to claim 1, wherein the first deploying portion includes two first deploying portions that branch from an upper end portion of the upwardly deploying portion, to be provided in a pair of left and right first upwardly deploying portions.

6. The saddled vehicle according to claim 1, wherein the first deploying portion has a rod shape that is thinner than the upwardly deploying portion.

7. The saddled vehicle according to claim 1, wherein
an inflator that jets gas into the airbag to deploy the airbag is connected to the airbag, and
a separating mechanism is provided that separates the airbag from the inflator after the airbag is deployed.

8. The saddled vehicle according to claim 1, wherein the upwardly deploying portion is deployed upward along a front surface of a torso of the occupant sitting on the seat, and the first deploying portion is configured to cover an arm of the occupant from above when the occupant is sitting on the seat and grasping a handle for steering; and the downwardly deploying portion is configured to sandwich the arm between the downwardly deploying portion and the upwardly deploying portion.

9. The saddled vehicle according to claim 1, wherein the upwardly deploying portion is deployed upward along a front surface of a torso of the occupant sitting on the seat, and the first deploying portion is configured to cover a shoulder of the occupant from above when the occupant is sitting on the seat and grasping a handle for steering, and the downwardly deploying portion is configured to sandwich the shoulder between the downwardly deploying portion and the upwardly deploying portion.

10. A vehicle comprising an airbag provided in front of a riding position for an occupant, wherein the vehicle is a stand-up vehicle on which an occupant stands at the riding position, and the airbag includes an upwardly deploying portion that is deployed upward when deployed, a first deploying portion that extends laterally outward, or rearward and laterally outward with respect to the upwardly deploying portion, from an upper part of the upwardly deploying portion when deployed, and a downwardly portion that bends and extends downward from the first deploying portion when deployed.

11. Occupant-protecting equipment comprising:
occupant equipment worn by an occupant riding on a vehicle; and
an airbag, wherein
the airbag is supported by the occupant equipment and is located on a front surface side of a torso of the occupant, and
the airbag includes an upwardly deploying portion that is deployed upward when deployed, a first deploying portion that extends laterally outward, rearward, or rearward and outward with respect to the upwardly deploying portion, from an upper part of the upwardly deploying portion when deployed, and a downwardly deploying portion that bends and extends downward from the first deploying portion when deployed.

* * * * *